United States Patent
Lee et al.

(10) Patent No.: US 9,678,376 B2
(45) Date of Patent: Jun. 13, 2017

(54) LIQUID CRYSTAL DISPLAY COMPRISING A LIQUID CRYSTAL LAYER POSITIONED IN A MICROCAVITY HAVING A COLUMN PORTION IN CONTACT WITH A TAPERED SIDE WALL OF THE MICROCAVITY

(71) Applicant: SAMSUNG DISPLAY CO., LTD., Yongin, Gyeonggi-Do (KR)

(72) Inventors: Dae Ho Lee, Seoul (KR); Yong Seok Kim, Seoul (KR); Pil Sook Kwon, Incheon (KR); Won Tae Kim, Suwon-si (KR); Sung Hwan Won, Suwon-si (KR); Jong Seong Kim, Seoul (KR); Woo Jae Lee, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 179 days.

(21) Appl. No.: 14/108,910

(22) Filed: Dec. 17, 2013

(65) Prior Publication Data
US 2014/0226118 A1     Aug. 14, 2014

(30) Foreign Application Priority Data
Feb. 12, 2013 (KR) .................. 10-2013-0014967

(51) Int. Cl.
*G02F 1/1333* (2006.01)
(52) U.S. Cl.
CPC ...... *G02F 1/133345* (2013.01); *G02F 1/1333* (2013.01); *G02F 1/133377* (2013.01)

(58) Field of Classification Search
CPC ............ G02F 1/133345; G02F 1/1333; G02F 1/133377
See application file for complete search history.

(56) References Cited

U.S. PATENT DOCUMENTS

| | | | | |
|---|---|---|---|---|
| 5,461,003 A * | 10/1995 | Havemann | ........ | H01L 21/02126 257/E21.581 |
| 2006/0146267 A1* | 7/2006 | Choi | ................ | G02F 1/133377 349/156 |
| 2012/0062448 A1* | 3/2012 | Kim | ................ | G02F 1/133377 345/55 |
| 2013/0093985 A1* | 4/2013 | Kang | ................ | G02F 1/133377 349/106 |
| 2013/0321734 A1 | 12/2013 | Won et al. | | |
| 2014/0152948 A1 | 6/2014 | Chae et al. | | |

FOREIGN PATENT DOCUMENTS

| | | |
|---|---|---|
| KR | 10-2013-0134153 | 12/2013 |
| KR | 10-2014-0025739 | 3/2014 |

* cited by examiner

*Primary Examiner* — Paul Lee
(74) *Attorney, Agent, or Firm* — F. Chau & Associates, LLC

(57) ABSTRACT

A liquid crystal display includes a microcavity formed on an insulation substrate that has a tapered side wall; a liquid crystal layer positioned in the microcavity; and a column portion in contact with the tapered side wall of the microcavity and between microcavities. The column portion includes a second column organic layer and a first column insulating layer formed outside the second column organic layer, and a side surface of first column insulating layer coincides with the side wall of the microcavity.

6 Claims, 42 Drawing Sheets

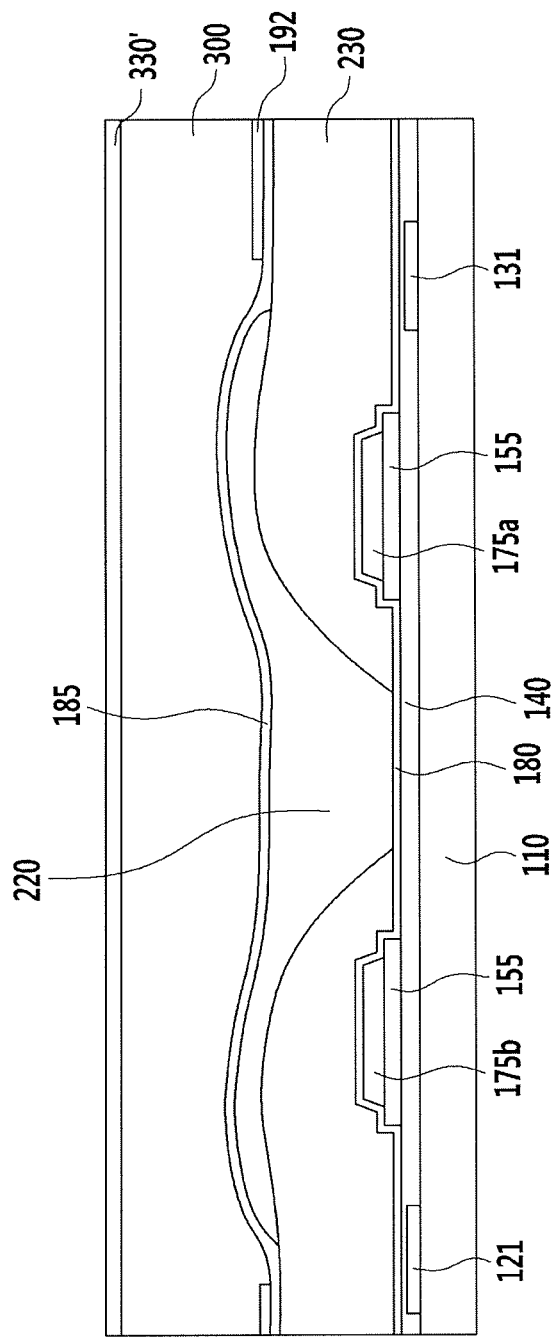

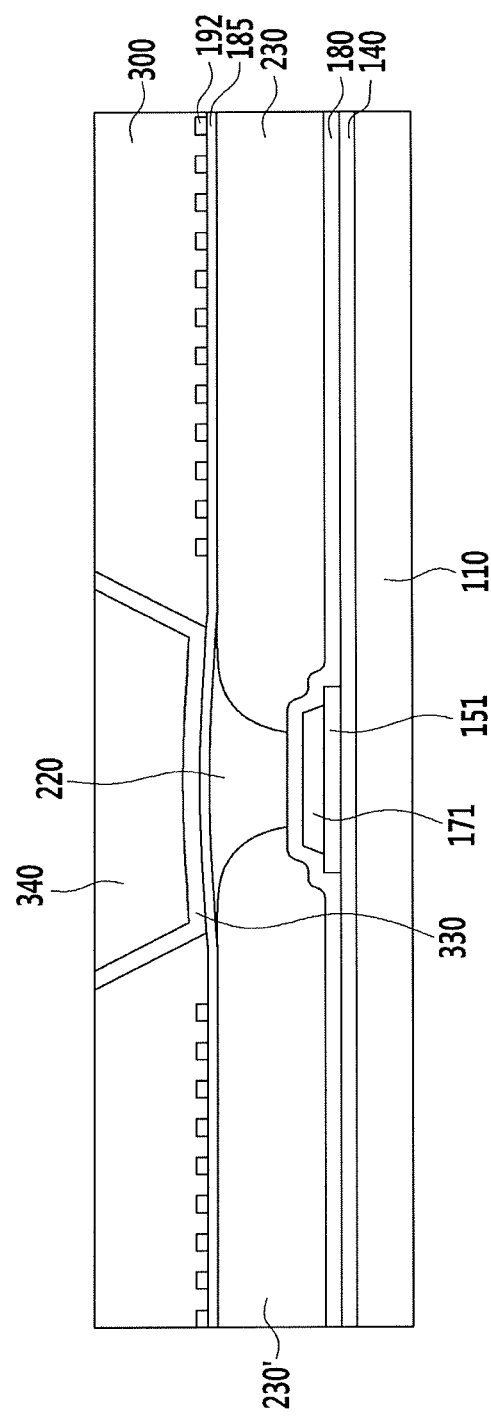

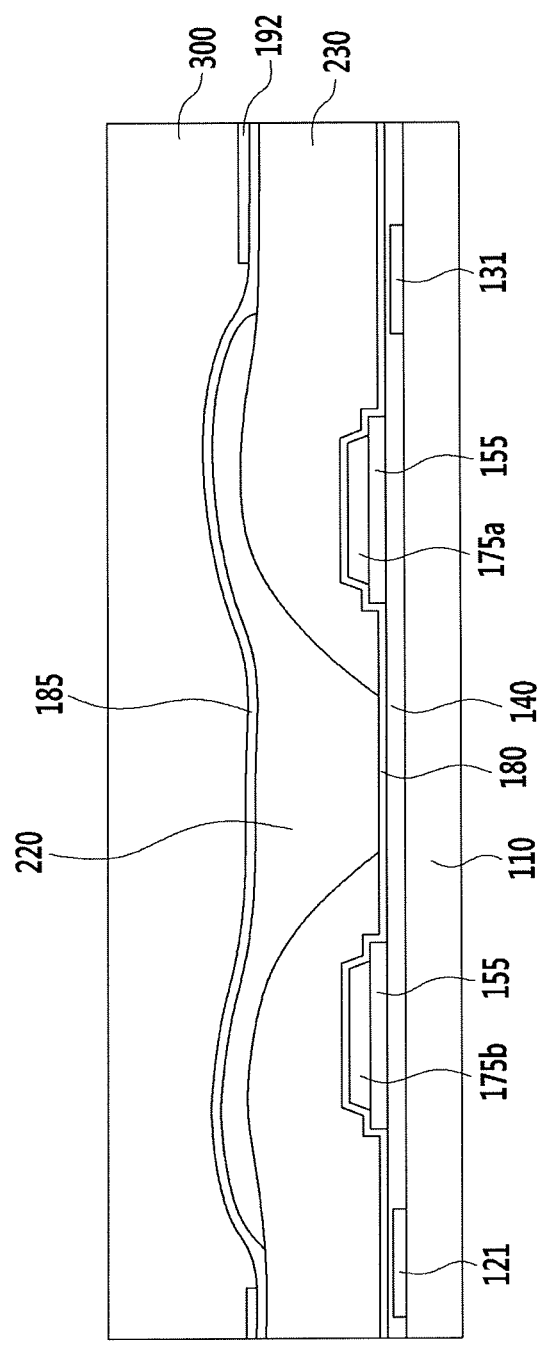

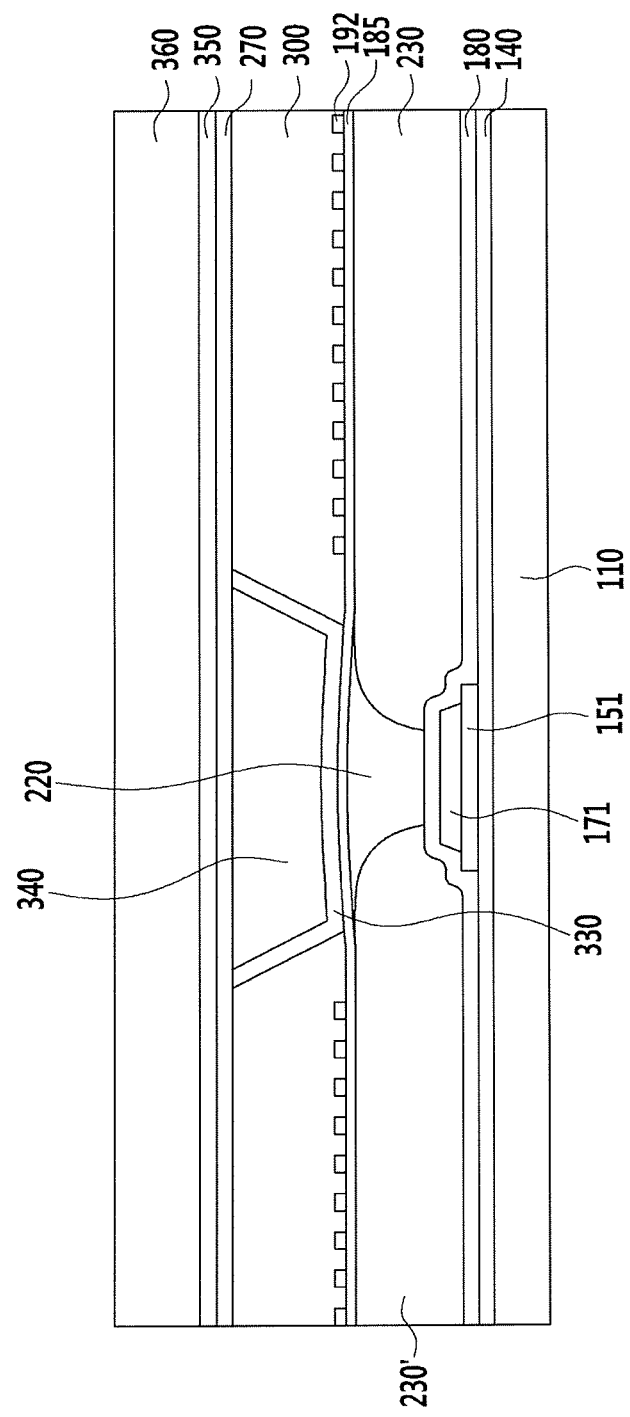

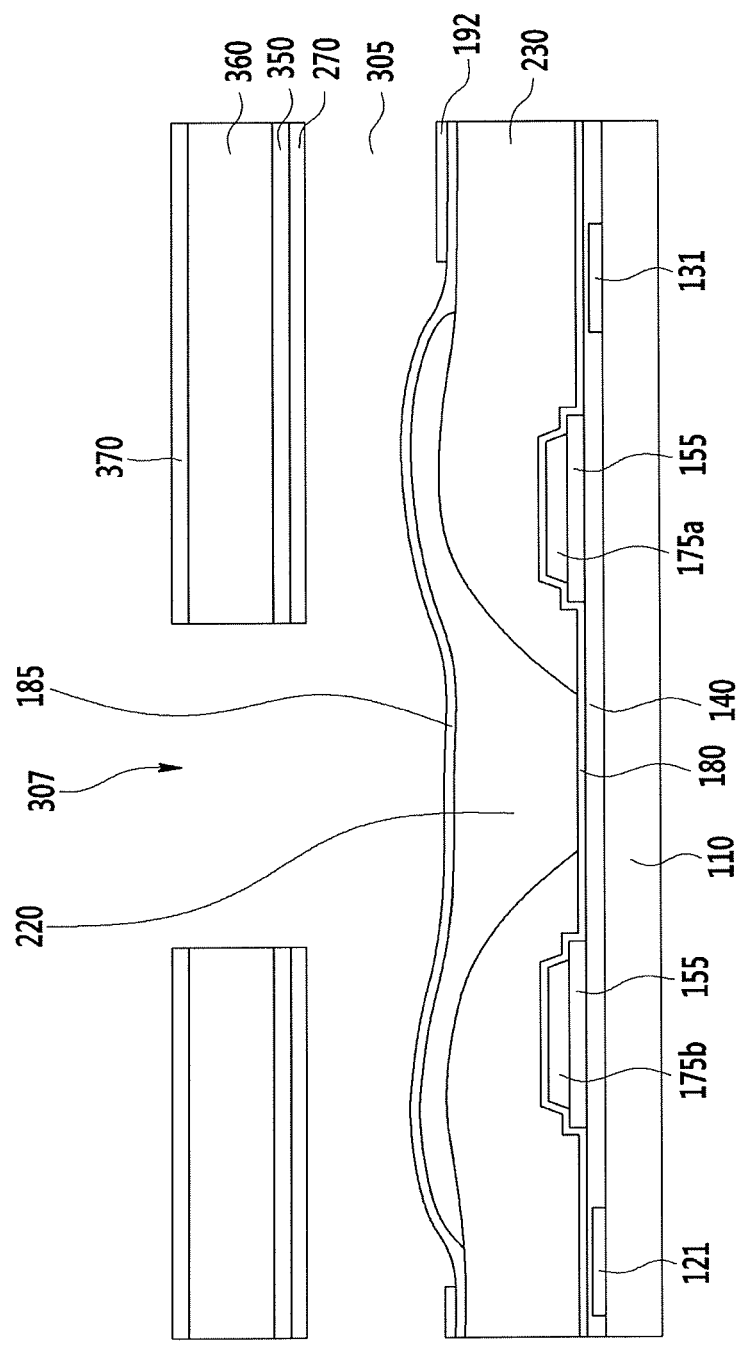

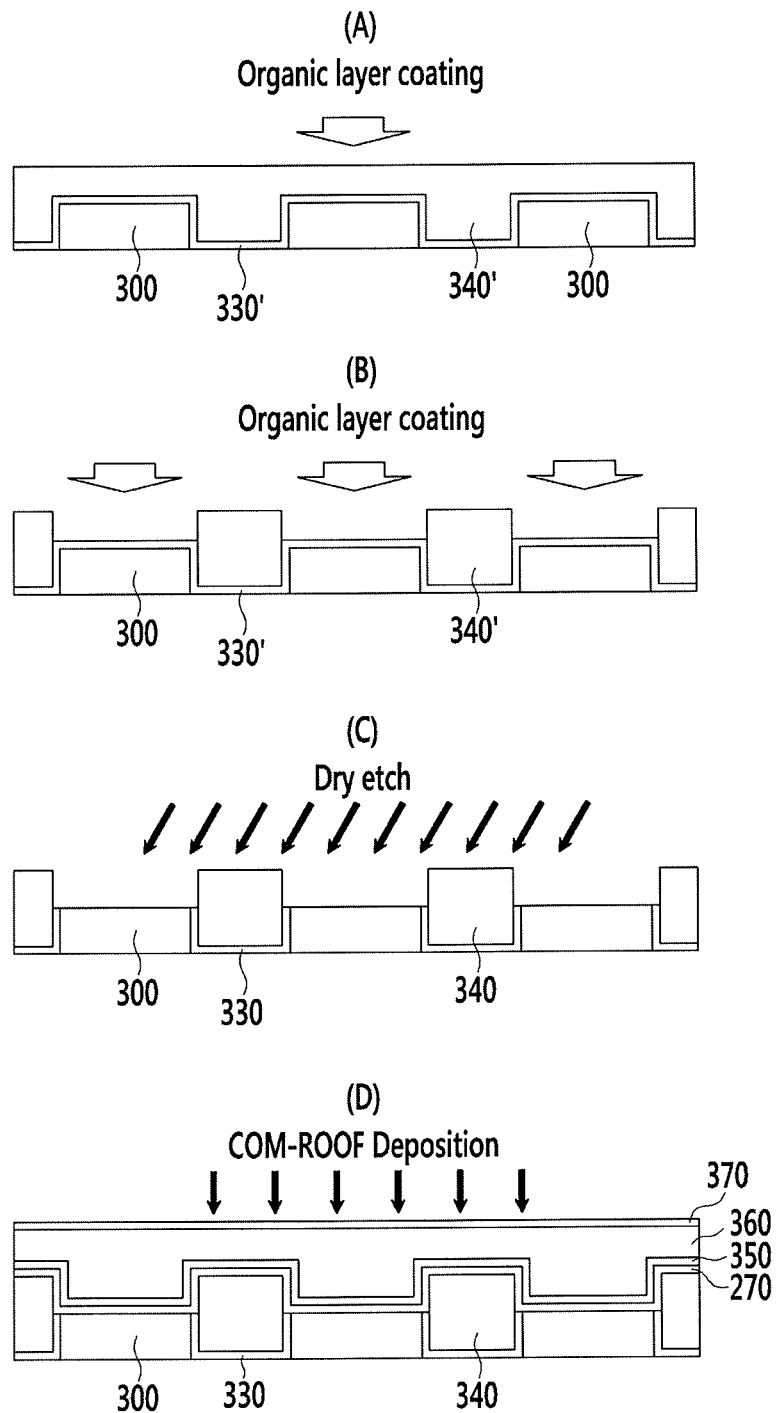

LIQUID CRYSTAL DISPLAY COMPRISING A LIQUID CRYSTAL LAYER POSITIONED IN A MICROCAVITY HAVING A COLUMN PORTION IN CONTACT WITH A TAPERED SIDE WALL OF THE MICROCAVITY

CROSS-REFERENCE TO RELATED APPLICATION

This application claims priority under 35 USC §119 from Korean Patent Application No. 10-2013-0014967 filed in the Korean Intellectual Property Office on Feb. 12, 2013, the contents of which are herein incorporated by reference in their entirety.

BACKGROUND (a) Technical Field

The present disclosure is directed to a liquid crystal display and a manufacturing method thereof, and more particularly, to a liquid crystal display having a liquid crystal layer (nanocrystal layer) included in a microcavity and a manufacturing method thereof.

(b) Discussion of the Related Art

A liquid crystal display is a widely used flat panel display device and includes two display panels upon which field generating electrodes, such as a pixel electrode and a common electrode, are formed, and a liquid crystal layer interposed therebetween.

A liquid crystal display generates an electric field in a liquid crystal layer by applying voltages to the field generating electrodes to change orientations of the liquid crystal molecules of the liquid crystal layer and control polarization of incident light, thereby displaying an image.

One type of a liquid crystal display device has an embedded microcavity (EM) nanocrystal structure and is manufactured by forming a sacrificial layer with a photoresist, removing the sacrificial layer after coating a support member thereon, and filling a liquid crystal in an empty space formed by removing the sacrificial layer.

In this case, the common electrode is formed with a curved structure according to the sacrificial layer to be positioned close to the underlying pixel electrode. Accordingly, there may be an insufficient interval between the pixel electrode and the common electrode that permits a short circuit to be generated when removing the sacrificial layer. In addition, even if a short circuit is not generated, a parasitic capacitance may be generated on the corresponding portion that may distort an electric field.

SUMMARY

Embodiments of the present disclosure provide a liquid crystal display that maintains a uniform distance between a common electrode and a pixel electrode to prevent a short circuit with the pixel electrode and to prevent electric field distortion, and a manufacturing method thereof.

A liquid crystal display according to an exemplary embodiment of the present disclosure includes: a microcavity formed on an insulation substrate that has a tapered side wall; a liquid crystal layer positioned in the microcavity; and a column portion in contact with the tapered side wall of the microcavity and between microcavities. The column portion includes a second column organic layer and a first column insulating layer formed outside the second column organic layer, and a side surface of first column insulating layer coincides with the side wall of the microcavity.

The first column insulating layer may be formed at a side surface and a lower surface of the second column organic layer.

The liquid crystal display may include a pixel electrode formed on the insulation substrate and under the microcavity; and a common electrode covering the liquid crystal layer and the column portion.

The column portion may include a photoresist, a material for a light blocking member, an inorganic material, or an organic material.

The column portion may include a photoresist, a material for a light blocking member, an inorganic material, or an organic material.

The first column insulating layer may include an inorganic insulating material such as silicon nitride (SiNx), silicon oxide (SiOx), or silicon oxynitride (SiOxNy). The second column organic layer may be formed of a photoresist or an organic materials.

The common electrode may have a horizontal structure or a step structure.

A third passivation layer covering the pixel electrode thereon may be further included.

A supporting member covering the common electrode on the common electrode may be further included. The supporting member may include a lower insulating layer positioned on the common electrode, a roof layer formed on the insulating layer, and an upper insulating layer formed on the roof layer.

A manufacturing method of a liquid crystal display according to an exemplary embodiment of the present disclosure includes: forming a sacrificial layer that covers a pixel electrode and has a tapered side wall; forming a column portion between sacrificial layers that has a side wall corresponding to the sacrificial layer, including forming a first column insulating layer material covering a space between sacrificial layers, and forming a second column organic layer material covering the first column insulating layer material; forming a liquid crystal injection hole; removing the sacrificial layer through the liquid crystal injection hole to form a microcavity; and injecting a liquid crystal into the microcavity.

The method may include etching the first column insulating layer material and the second column organic layer material to form a first column insulating layer and a second column organic layer.

Etching the first column insulating layer material and the second column organic layer material may be performed until the sacrificial layer is exposed by removing the first column insulating layer material and the second column organic layer material covering the sacrificial layer.

The method may include exposing and developing the second column organic layer material covering the first column insulating layer material to maintain the second column organic layer material in the space between the sacrificial layers; and etching second column organic layer material positioned between the sacrificial layers and first column insulating layer material on the sacrificial layer together to form the first column insulating layer and the second column organic layer.

The step of etching the second column organic layer material the first column insulating layer material may be performed until the sacrificial layer is exposed by removing the first column insulating layer material on the sacrificial layer, and the formed second column organic layer may be formed higher than the sacrificial layer.

The first column insulating layer may be formed of an inorganic insulating material such as silicon nitride (SiNx), silicon oxide (SiOx), and silicon oxynitride (SiOxNy), and the second column organic layer may be formed of a photoresist or an organic material.

The method may further include forming the pixel electrode on an insulation substrate; forming a common electrode on the sacrificial layer and the column portion; and forming a supporting member on the common electrode.

The method may further include forming a third passivation layer covering the pixel electrode between the pixel electrode and the sacrificial layer.

The common electrode formed between the sacrificial layer and the column portion may have a step structure corresponding according to a step in the sacrificial layer and the column portion, or a horizontal structure.

A manufacturing method of a liquid crystal display according to an exemplary embodiment of the present disclosure includes: forming a sacrificial layer covering a pixel electrode and having a tapered side wall; forming a column portion having a side wall according to the sacrificial layer between sacrificial layers; forming a common electrode on the sacrificial layer and the column portion; forming a lower insulating layer on the common electrode to cover the common electrode; forming a roof layer on the lower insulating layer but not in a liquid crystal injection hole formation regions; forming an upper insulating layer on the roof layer as well as in the liquid crystal injection hole formation region where the roof layer is not formed; etching the lower insulating layer, the upper insulating layer, and the common electrode in the liquid crystal injection hole formation regions to expose the sacrificial layer; removing the sacrificial layer through the liquid crystal injection hole to form a microcavity; and injecting a liquid crystal into the microcavity.

The formation of the column portion may include: forming a first column insulating layer material covering a space between sacrificial layers; forming a second column organic layer material covering the first column insulating layer material; and etching the first column insulating layer material and the second column organic layer material until the sacrificial layer is exposed by removing the first column insulating layer material and the second column organic layer material covering the sacrificial layer, to form a first column insulating layer and a second column organic layer.

The formation of the column portion may include: forming the first column insulating layer material covering a space between sacrificial layers; forming, exposing, and developing the second column organic layer material covering the first column insulating layer material to maintain the second column organic layer material in the space between the sacrificial layers; and etching the second column organic layer material positioned between the sacrificial layers and the first column insulating layer material on the sacrificial layer together until the sacrificial layer is exposed by removing the first column insulating layer material on the sacrificial layer, to form the first column insulating layer and the second column organic layer. The second column organic layer may be formed higher than the sacrificial layer.

As described above, a column portion is formed beside the sacrificial layer to maintain a predetermined distance between the common electrode and the pixel electrode to prevent both a short circuit with the pixel electrode and electric field distortion.

BRIEF DESCRIPTION OF THE DRAWINGS

FIG. 15 shows a manufacturing method of a liquid crystal display according to another exemplary embodiment of the present disclosure.

DETAILED DESCRIPTION OF EXEMPLARY EMBODIMENTS

Figure 1:
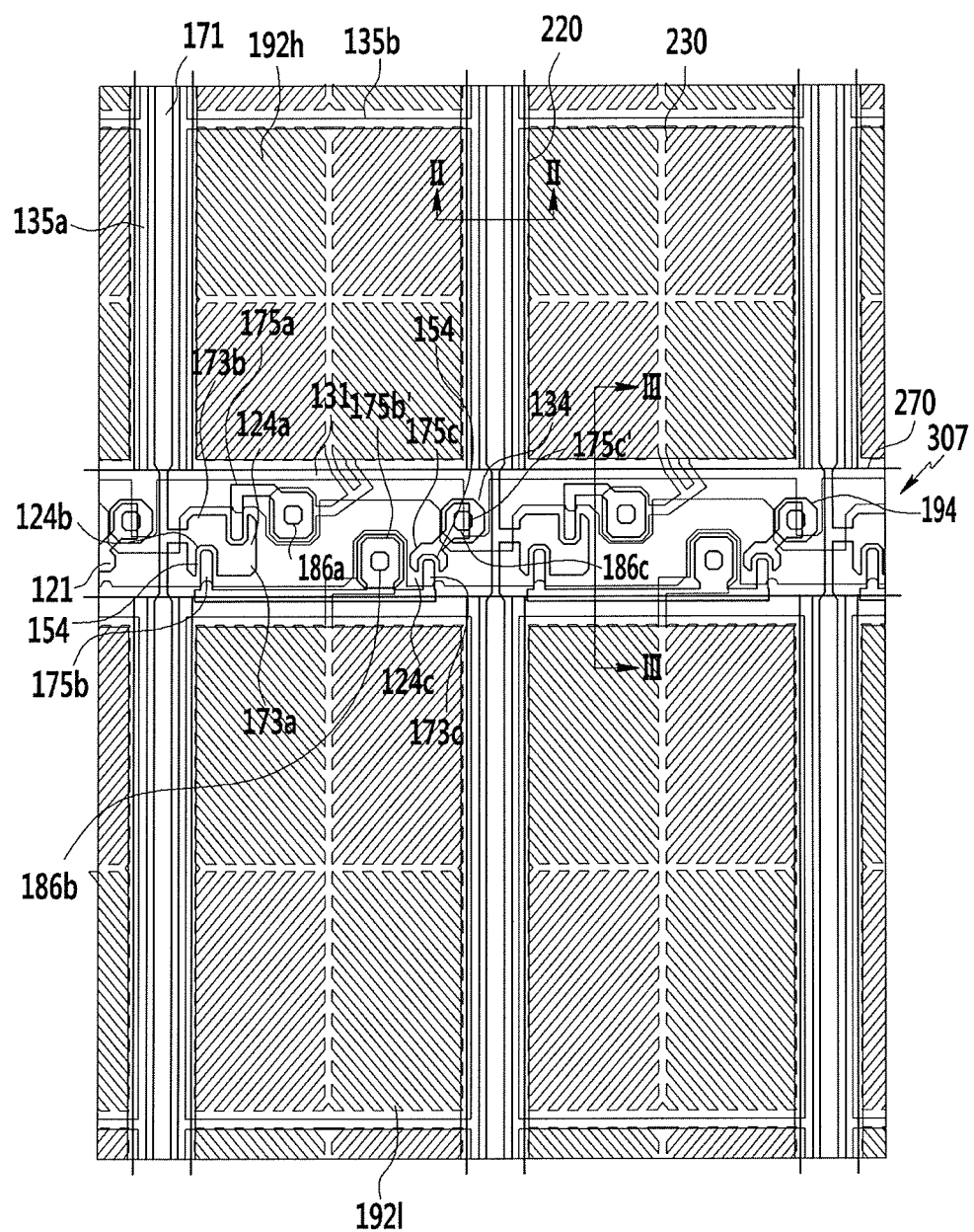
FIG. 1 is a layout view of a liquid crystal display according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

Now, a liquid crystal display according to an exemplary embodiment of the present disclosure will be described with reference to FIG. 1 to FIG. 3.

Figure 2:
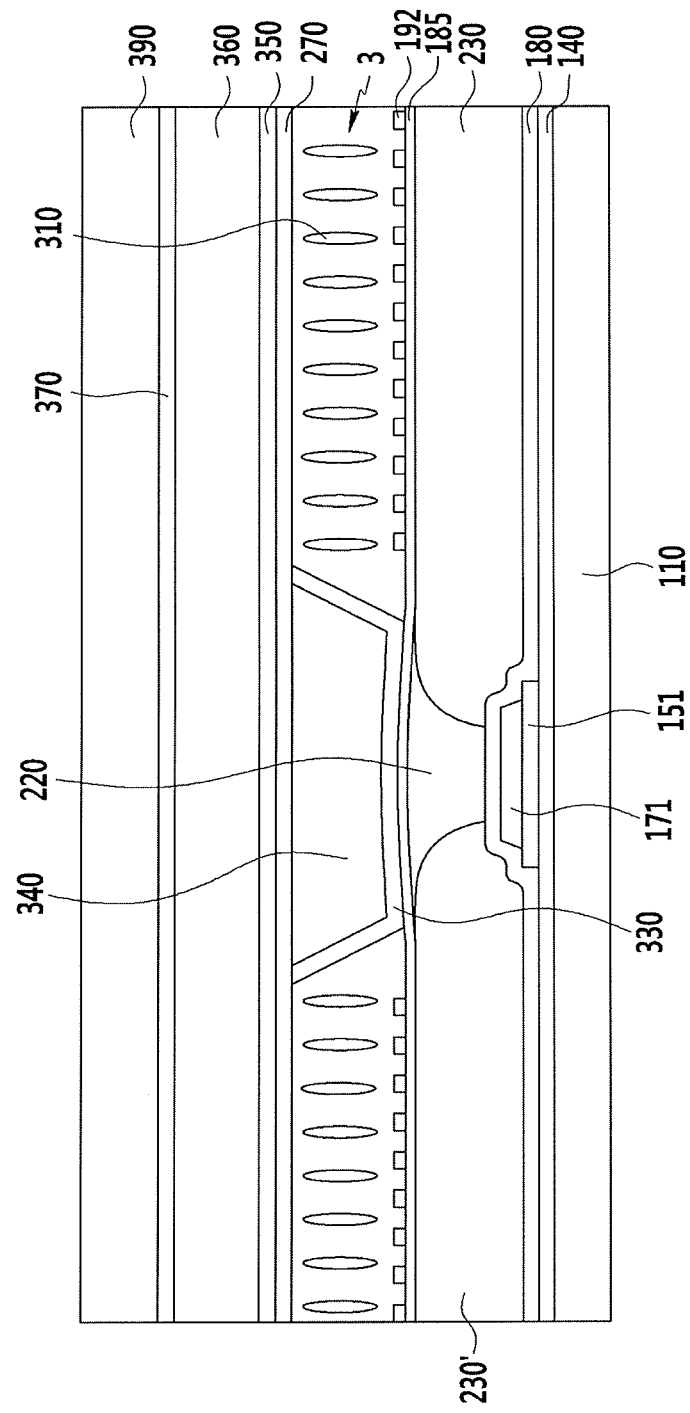
FIG. 2 is a cross-sectional view taken along the line II-II of FIG. 1.
Figure 3:
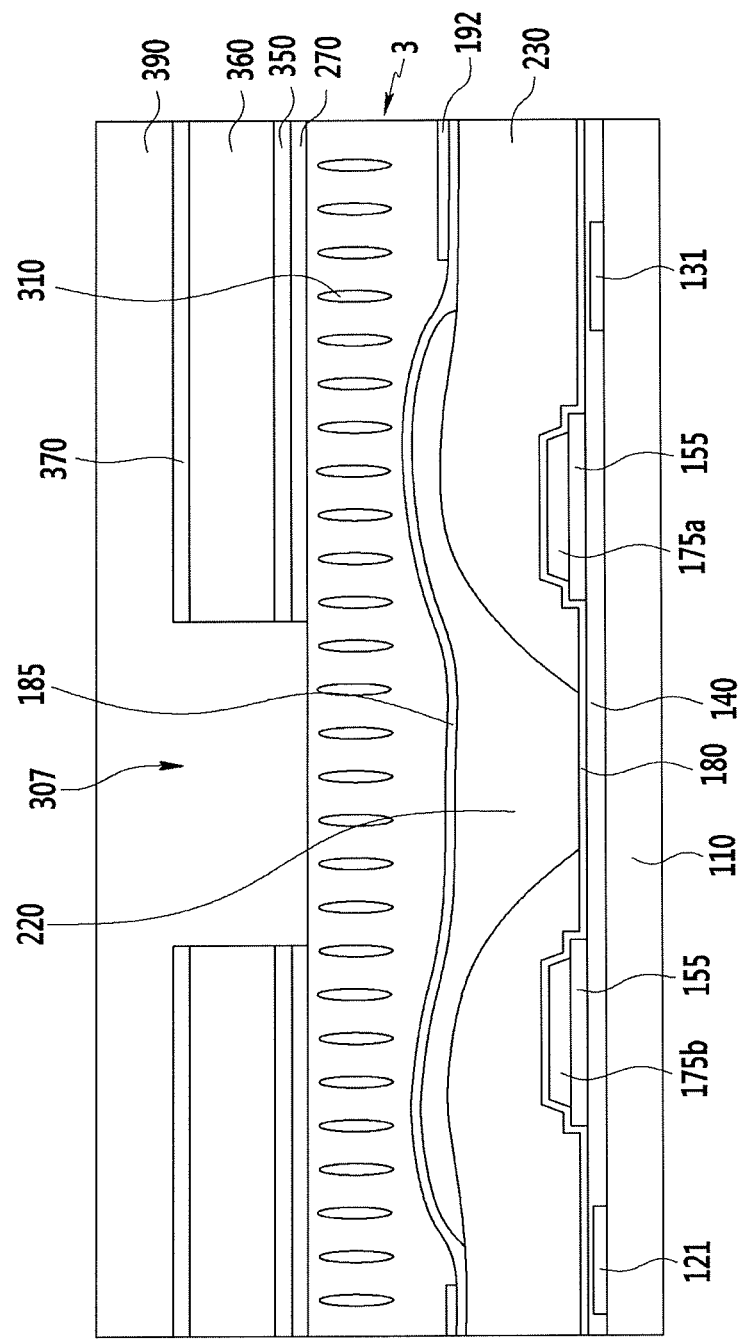
FIG. 3 is a cross-sectional view taken along the line III-III of FIG. 1.

FIG. 1 is a layout view of a liquid crystal display according to an exemplary embodiment of the present disclosure, FIG. 2 is a cross-sectional view taken along the line II-II of FIG. 1, and FIG. 3 is a cross-sectional view taken along the line III-III of FIG. 1.

A gate line 121 and a storage voltage line 131 are formed on an insulation substrate 110 made of transparent glass, plastic, etc. The gate line 121 includes a first gate electrode 124a, a second gate electrode 124b, and a third gate electrode 124c. The storage voltage line 131 includes storage electrodes 135a and 135b and a protrusion 134 that protrudes toward the gate line 121. The storage electrodes 135a and 135b have a structure that surrounds a first subpixel electrode 192h and a second subpixel electrode 192l of a previous pixel. A horizontal portion of the storage electrode 135b of FIG. 1 may be a wire connected with a portion of a pixel adjacent to a current pixel.

A gate insulating layer 140 is formed on the gate line 121 and the storage voltage line 131. A semiconductor 151 positioned below a data line 171, a semiconductor 155 positioned below source/drain electrodes, and a semiconductor 154 positioned at a channel portion of a thin film transistor are formed on the gate insulating layer 140.

A plurality of ohmic contacts may be formed on each of the semiconductors 151, 154, and 155 and between the data line 171 and source/drain electrodes, which are omitted in the drawing.

On each of the semiconductors 151, 154, and 155 and the gate insulating layer 140, a plurality of data lines 171 including a first source electrode 173a and a second source electrode 173b, a first drain electrode 175a, a second drain electrode 175b, a third source electrode 173c, and a third drain electrode 175c, are formed.

The first gate electrode 124a, the first source electrode 173a, and the first drain electrode 175a form a first thin film transistor Qa together with the semiconductor 154, and a channel of the thin film transistor is formed at the semiconductor portion 154 between the first source electrode 173a and the first drain electrode 175a. Similarly, the second gate electrode 124b, the second source electrode 173b, and the second drain electrode 175b form a second thin film transistor Qb together with the semiconductor 154, and a channel of the thin film transistor is formed at the semiconductor portion 154 between the second source electrode 173b and the second drain electrode 175b. The third gate electrode 124c, the third source electrode 173c, and the third drain electrode 175c form a third thin film transistor Qc together with the semiconductor 154, and a channel of the thin film transistor is formed at the semiconductor portion 154 between the third source electrode 173c and the third drain electrode 175c.

The data line 171 of an exemplary embodiment may have a structure in which a width thereof narrows in a region of the thin film transistor in the vicinity of an extension 175c' of the third drain electrode 175c. The structure helps maintain an interval with adjacent wiring and reduces signal interference, but does not necessarily need to be formed in this way.

A first passivation layer 180 is formed on the data conductors 171, 173c, 175a, 175b, and 175c and an exposed portion of the semiconductor 154. The first passivation layer 180 may include an inorganic insulator such as silicon nitride (SiNx), silicon oxynitride (SiOxNy), and silicon oxide (SiOx), or an organic insulator.

A color filter 230 is formed on the passivation layer 180. Color filters 230 of a same color are formed in pixels adjacent in a vertical, data line, direction. Also, color filters 230 and 230' of different colors are formed in pixels adjacent in a horizontal, gate line, direction, and two color filters 230 and 230' may overlap the data line 171. The color filters 230 and 230' may display one of primary colors such as red, green, and blue. However, the color filters 230 and 230' may also display one of cyan, magenta, yellow, and white, not being limited to the three primary colors of red, green, and blue.

A light blocking black matrix member 220 is formed on the color filter 230 and 230'. The light blocking member 220 is formed with respect to a region, hereafter referred to as "a transistor formation region", where the gate line 121, the thin film transistor, and the data line 171 are formed, and has a lattice structure having openings that correspond to a region where an image is displayed. The color filter 230 is formed in the opening of the light blocking member 220. In addition, the light blocking member 220 is made of a material through which light is not transmitted.

A second passivation layer 185 is formed on the color filter 230 and the light blocking member 220 to cover the color filter 230 and the light blocking member 220. The second passivation layer 185 may include an inorganic insulator such as silicon nitride (SiNx), silicon oxynitride (SiOxNy), and silicon oxide (SiOx), or an organic insulator. In addition to what is shown in the cross-sectional views of FIG. 2 and FIG. 3, if there is a step due to a thickness difference between the color filter 230 and the light blocking member 220, the second passivation layer 185 may reduce or remove the step.

A first contact hole 186a and a second contact hole 186b, which expose the first drain electrode 175a and extensions 175b' of the second drain electrode 175b, respectively, are formed in the color filter 230, the light blocking member 220, and the passivation layers 180 and 185. Further, a third contact hole 186c which exposes the protrusion 134 of the storage voltage line 131 and the extension 175c' of the third drain electrode 175c is formed in the color filter 230, the light blocking member 220, and the passivation layers 180 and 185.

In a present exemplary embodiment, the light blocking member 220 and the color filter 230 have contact holes 186a, 186b, and 186c, and etching the contact holes may be challenging due to differences between the materials of the light blocking member 220 and the color filter 230 those of the passivation layers 180 and 185. Therefore, when forming the contact holes 186a, 186b, and 186c, the light blocking member 220 or the color filter 230 may be previously removed from the position where the contact holes 186a, 186b, and 186c are formed.

Alternatively, according to an exemplary embodiment, the contact holes 186a, 186b, and 186c may be formed by changing a position of the light blocking member 220 and etching only the color filter 230 and the passivation layers 180 and 185.

A pixel electrode 192 that includes the first subpixel electrode 192h and the second subpixel electrode 192l is formed on the second passivation layer 185. The pixel electrode 192 may be made of a transparent conductive material such as ITO or IZO.

The first subpixel electrode 192h and the second subpixel electrode 192l are adjacent to each other in a column direction, have a rectangular shape, and include a cross stem that includes a transverse stem and a longitudinal stem crossing the transverse stem. Further, the first subpixel electrode 192h and the second subpixel electrode 192l are each divided into four subregions by the cross stem, and each subregion includes a plurality of minute branches.

The minute branches of the first subpixel electrode 192h and the second subpixel electrode 192l form angles of about 40 degrees to about 45 degrees with the gate line 121 or the transverse stem. Further, the minute branches of two adjacent subregions may be perpendicular to each other. In addition, a width of a minute branch may gradually increase or intervals between minute branches 194 may differ from each other.

The first subpixel electrode 192h and the second subpixel electrode 192l are physically and electrically connected with the first drain electrode 175a and the second drain electrode 175b through the contact holes 186a and 186b, and receive data voltages from the first drain electrode 175a and the second drain electrode 175b.

In addition, a connecting member 194 electrically connects the extension 175c' of the third drain electrode 175c and the protrusion 134 of the storage voltage line 131 through the third contact hole 186c. As a result, some of the data voltage applied to the second drain electrode 175b is diverted through the third source electrode 173c and thus the magnitude of a voltage applied to the second subpixel electrode 192l may be smaller than the magnitude of a voltage applied to the first subpixel electrode 192h.

Here, an area of the second subpixel electrode 192l may range from the same to double an area of the first subpixel electrode 192h.

In addition, an opening collecting gas discharged from the color filter 230 and an overcoat covering the corresponding opening with the same material as the pixel electrode 192 thereon may be formed on the second passivation layer 185. The opening and the overcoat are structures for blocking the gas discharged from the color filter 230 from being transferred to another element, and may not necessarily be included.

Figure 14A:
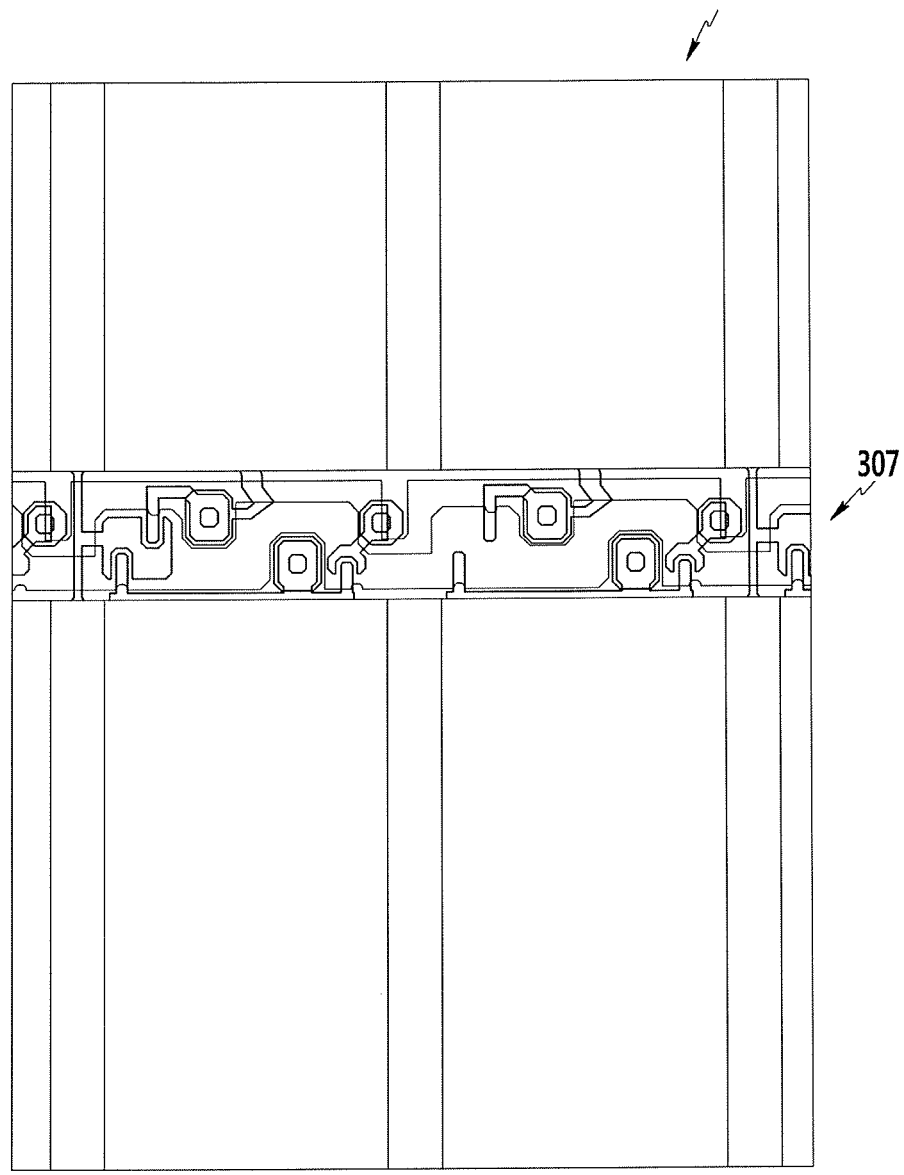
Figure 14B:
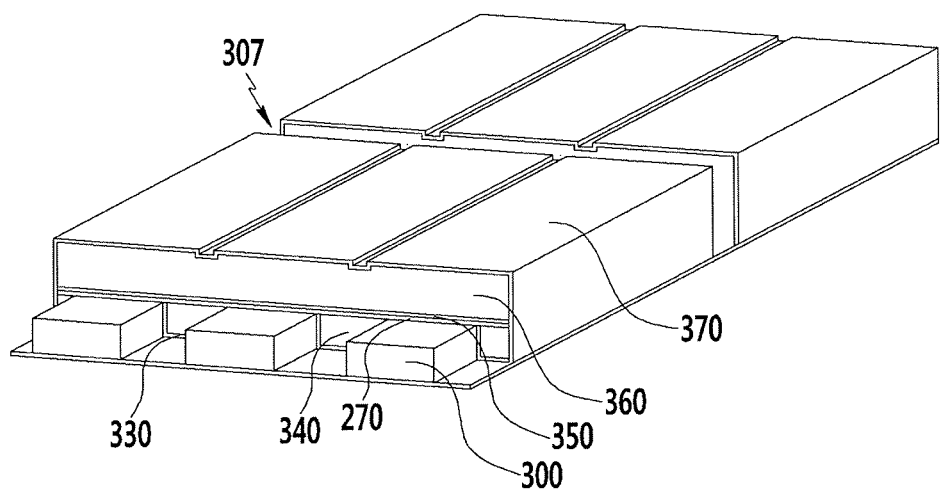
Figure 14C:
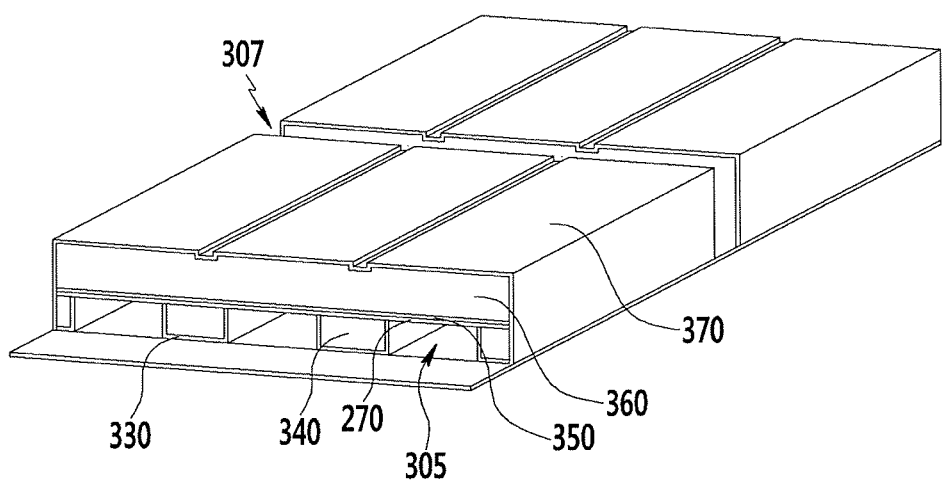
Figure 14D:
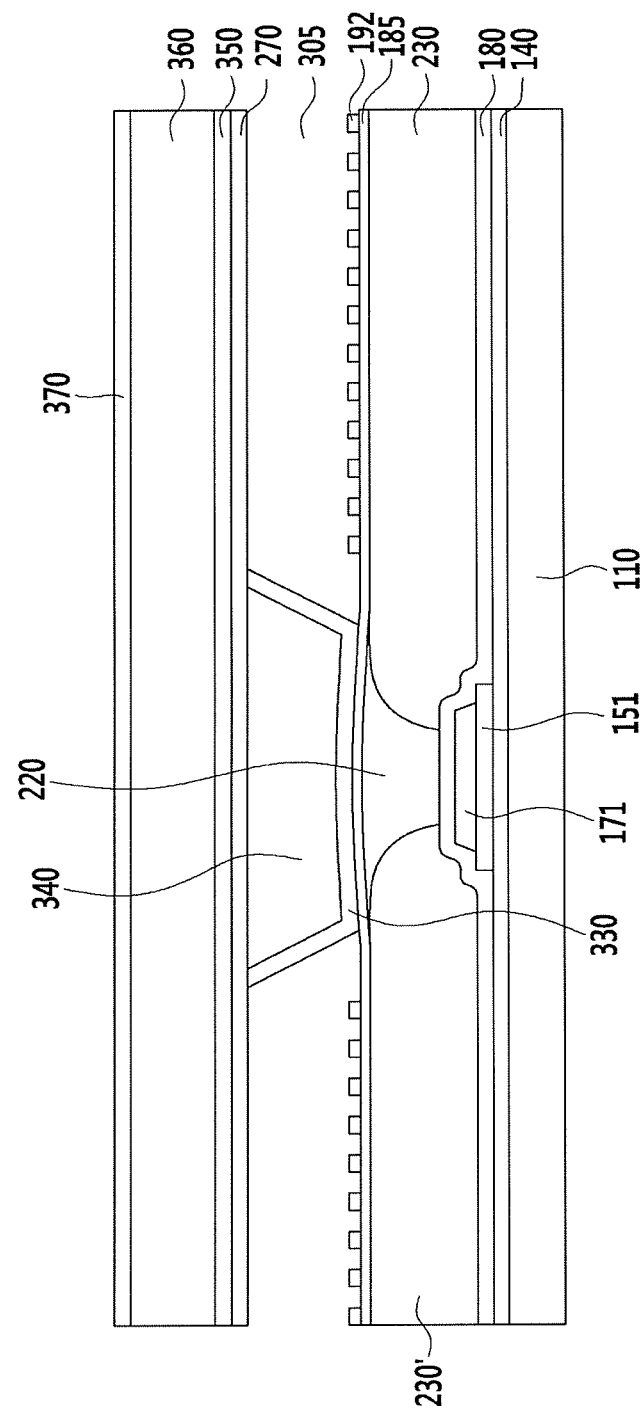

On the second passivation layer 185 and pixel electrode 192, a microcavity 305, shown in FIGS. 14C, 14D, and 14E, is positioned. A liquid crystal layer 3 is formed in the microcavity 305.

An upper surface of the microcavity 305 is substantially flat, and a side surface of the microcavity 305 is tapered. The microcavity 305 is a space generated while a sacrificial layer 300, shown in FIGS. 9A-9D, is formed and then removed. A common electrode 270 is positioned on the microcavity 305, and the pixel electrode 192 and the second passivation layer 185 are positioned thereunder. Column portions 330 and 340 are positioned at the side surface of the microcavity 305. That is, the microcavity 305 is a space defined by the common electrode 270, the pixel electrode 192, the second passivation layer 185, and the column portions 330 and 340.

The liquid crystal layer 3 is formed in the microcavity 305, and an alignment layer (not shown) may be formed in the microcavity 305 to align liquid crystal molecules 310 inserted in the microcavity 305. The alignment layer may include at least one material generally used as a liquid crystal alignment layer, such as polyamic acid, polysiloxane, or polyimide.

The liquid crystal layer 3 is formed in the microcavity 305, or more accurately, in the alignment layer. The liquid crystal molecules 310 are initially aligned by the alignment layer, and the alignment direction changes according to the applied electric field. A height of the liquid crystal layer 3 corresponds to a height of the microcavity 305. The liquid crystal layer 3 positioned in the microcavity 305 is referred to as a nanocrystal layer.

The liquid crystal layer 3 formed in the microcavity 305 may be injected into the microcavity 305 using capillary action, and the alignment layer may be formed by capillary action.

The column portions 330 and 340 are positioned between the adjacent microcavities 305 and include a first column insulating layer 330 and a second column organic layer 340. The first column insulating layer 330 is formed of an inorganic insulating material such as silicon nitride (SiNx), silicon oxide (SiOx), or silicon oxynitride (SiOxNy), and the second column organic layer 340 is formed of a photoresist or various organic materials. According to an exemplary embodiment, the column portions 330 and 340 may be formed of one layer and include a positive or negative photoresist, an opaque light blocking member metal, or the inorganic material and organic material. When the column portions 330 and 340 are formed of an opaque metal, an inorganic material, and an organic material, at least a portion of the light blocking member 220 may be omitted. The column portions 330 and 340 prevent the microcavity 305 from collapsing, and the second column organic layer 340 also performs a main column function. The first column insulating layer 330 is formed outside the second column organic layer 340 thereby protecting the second column organic layer 340. Although FIG. 2 depicts the first column insulating layer 330 as formed at a side surface and a lower surface of the second column organic layer 340, however, according to an exemplary embodiment, the first column insulating layer 330 may be formed at an upper surface of the second column organic layer 340. The side surface of first column insulating layer 330 may coincide with the side wall of the microcavity 305.

The common electrode 270 is positioned on the liquid crystal layer 3 in the microcavity 305 as well as above the column portions 330 and 340. The common electrode 270 extends along the upper surface of the microcavity 305 or the liquid crystal layer 3 and the upper surfaces of the column portions 330 and 340. The common electrode 270 may be horizontally maintained above the microcavity because the common electrode 270 is supported by the column portions 330 and 340. The common electrode 270 is shown to be horizontally maintained in FIG. 2. However, the common electrode 270 may be curved due to a step of the column portions 330 and 340 and the microcavity 305. This will be described with reference to FIG. 15 and FIG. 16.

In addition, a plurality of common electrodes 270 are formed to be separated from each other by a a liquid crystal injection hole formation region 307, where a liquid crystal injection hole is formed, and the plurality of common electrodes 270 are formed with a predetermined interval therebetween. The liquid crystal injection hole formation region 307 is formed in a direction parallel to the gate line 121 such that the extension direction of the common electrode 270 is also the same as the extension direction of the gate line 121.

The common electrode 270 is made of a transparent conductive material such as ITO or IZO, and together with the pixel electrode 192 serves to generate an electric field to control an alignment direction of the liquid crystal molecules 310.

A supporting member is formed on the common electrode 270. The supporting member according to an exemplary embodiment of the present disclosure includes a lower insulating layer 350, a roof layer 360, and an upper insulating layer 370. The lower insulating layer 350 and the upper insulating layer 370 may protect the roof layer 360. According to an exemplary embodiment, the lower insulating layer 350 or the upper insulating layer 370 may be omitted The lower insulating layer 350 is formed on the common electrode 270. The lower insulating layer 350 may include an inorganic insulating material such as silicon nitride (SiNx), silicon oxide (SiOx), or silicon oxynitride (SiOxNy).

The roof layer 360 is formed on the lower insulating layer 350. The roof layer 360 may support a microcavity space between the pixel electrode 192 and the common electrode 270 where the nanocrystal is to be formed, and may be formed of a photoresist or various other organic materials.

The roof layer 360 is separated from the column portions 330 and 340 by the common electrode 270 and the lower insulating layer 350, and may be formed from the same material as the column portions 330 and 340.

The upper insulating layer 370 is formed on the roof layer 360. The upper insulating layer 370 may include an inorganic insulating material such as silicon nitride (SiNx), silicon oxide (SiOx), or silicon oxynitride (SiOxNy).

The liquid crystal injection hole formation region 307 may be positioned on one side surface of the lower insulating layer 350, the roof layer 360, and the upper insulating layer 370 to inject the liquid crystal into the microcavity 305. The liquid crystal injection hole formation region 307 includes a liquid crystal injection hole connected to each microcavity 305. The liquid crystal injection hole is an inlet portion where the liquid crystal is injected into the microcavity 305. In addition, the liquid crystal injection hole formation region 307 and the liquid crystal injection hole may be used to remove the sacrificial layer for forming the microcavity 305.

A capping layer 390 is formed on the upper insulating layer 370 thereby sealing the liquid crystal injection hole formation region 307. The liquid crystal injection hole formation region 307 is sealed by the capping layer 390, which prevents the liquid crystal molecules 310 from leaking to the outside. As shown in FIG. 2 and FIG. 3, the capping layer 390 may be formed across the entire region of the display device. The upper surface of the capping layer 390 may be parallel to the lower surface of the insulation substrate 110. However, according to an exemplary embodiment, the capping layer 390 may only be formed on and near the liquid crystal injection hole formation region 307.

Polarizers (not shown) may be positioned under the insulation substrate 110 and on the capping layer 390. The polarizers may include a polarized element that polarizes light passing therethrough and a tri-acetyl-cellulose (TAC) layer for ensuring durability. According to exemplary embodiments, the transmissive axes of the upper polarizer and lower polarizer may be either perpendicular or parallel to each other.

Next, a manufacturing method of a liquid crystal display according to an exemplary embodiment will be described with reference to FIG. 4 to FIG. 14.

FIG. 4 to FIG. 14 sequentially show a manufacturing method of a liquid crystal display according to an exemplary embodiment of FIG. 1 to FIG. 3.

Figure 4:
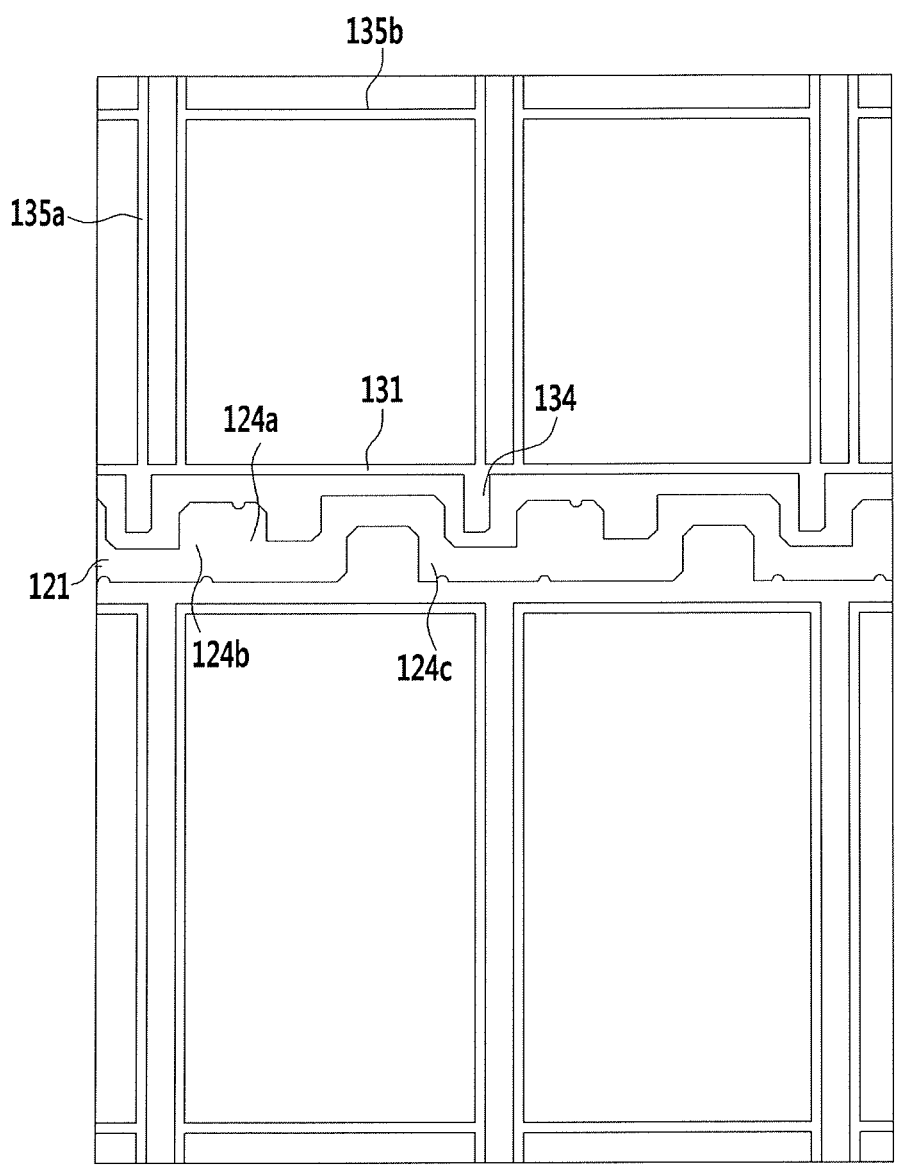
FIG. 4 to FIG. 14 sequentially show a manufacturing method of a liquid crystal display according to an exemplary embodiment of FIG. 1.

Firstly, FIG. 4 is a layout view showing a gate line 121 and a storage voltage line 131 formed on an insulation substrate 110.

Referring to FIG. 4, the gate line 121 and storage voltage line 131 are formed on the insulation substrate 110, which is made of a transparent glass, plastic, etc. The gate line 121 and storage voltage line 131 may be formed of the same material together with the same mask. Further, the gate line 121 includes a first gate electrode 124a, a second gate electrode 124b, and a third gate electrode 124c, and the storage voltage line 131 includes storage electrodes 135a and 135b and a protrusion 134 that protrudes in the same direction as the gate line 121. The storage electrodes 135a and 135b surround a first subpixel electrode 192h and a second subpixel electrode 192l of an adjacent pixel. Since separate gate and storage voltages may be respectively applied to the gate line 121 and storage voltage line 131, the gate line 121 and the storage voltage line 131 are separated from each other. The storage voltage may have a constant voltage level or may have a swing voltage level.

A gate insulating layer 140 that covers the gate line 121 and the storage voltage line 131 is formed on the gate line 121 and the storage voltage line 131.

Figure 5:
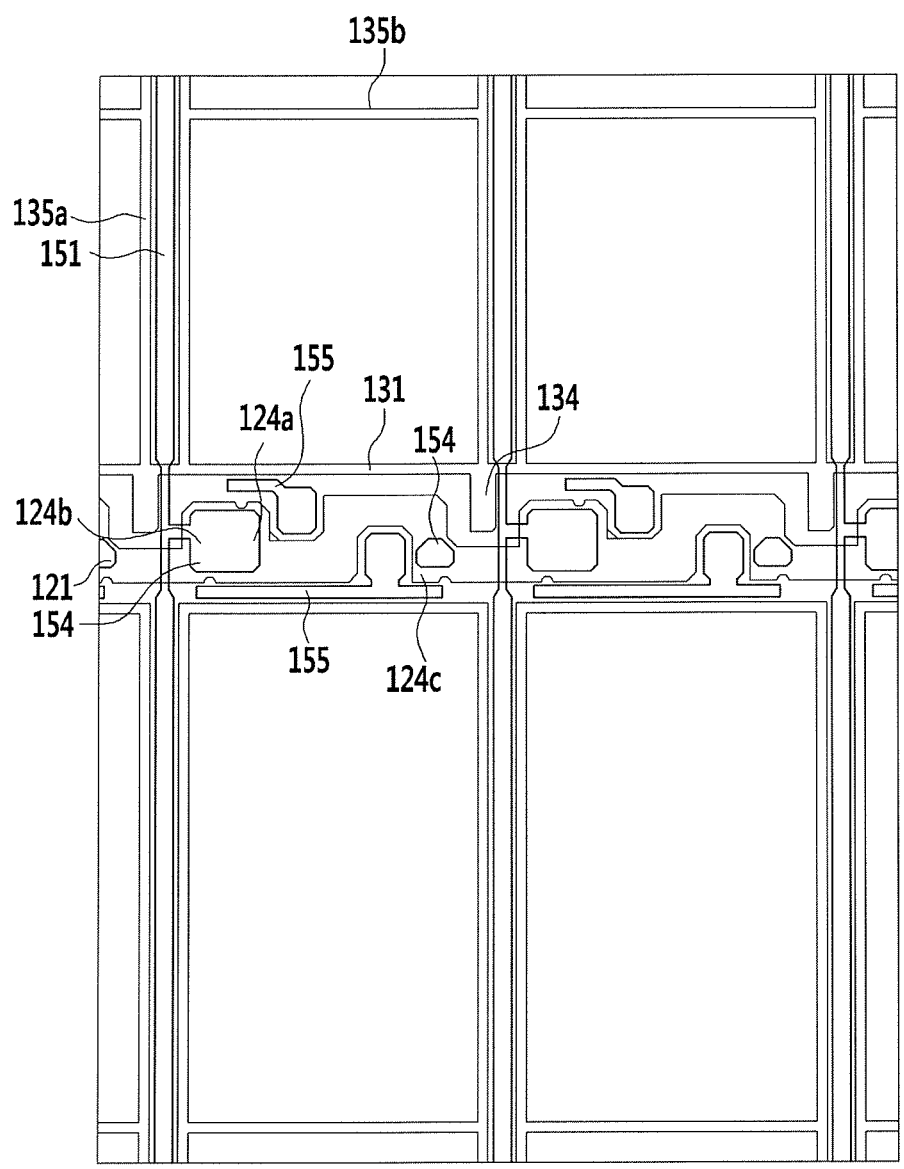
Figure 6:
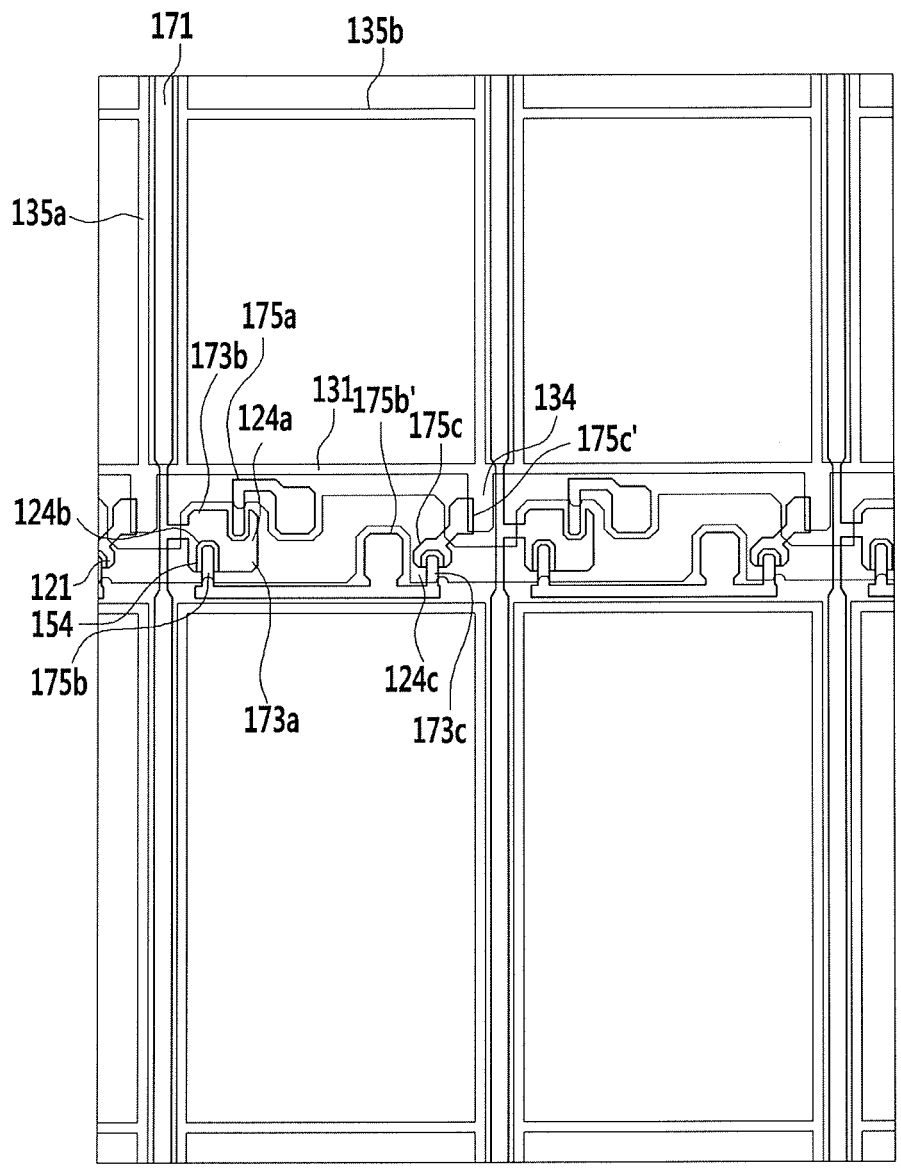

Next, as shown in FIG. 5 and FIG. 6, semiconductors 151, 154, and 155, a data line 171, and source/drain electrodes 173a, 173b, 173c, 175a, 175b, and 175c are formed on the gate insulating layer 140.

FIG. 5 is a layout view that shows the semiconductors 151, 154, and 155, and FIG. 6 is a layout view that shows the data line 171 and the source/drain electrodes 173a, 173b, 173c, 175a, 175b, and 175c. However, in actuality, the semiconductors 151, 154, and 155, the data line 171, and the source/drain electrodes 173a, 173b, 173c, 175a, 175b, and 175c may be formed together by a process explained below.

That is, a material for the semiconductor and a material for the data line/source electrode/drain electrode are sequentially deposited. Thereafter, two patterns are formed together through one exposing, developing, and etching process using one mask, such as a slit mask or a transflective mask. In this case, to avoid etching the semiconductor 154 positioned at the channel part of the thin film transistor, the corresponding portion is exposed through the slit or transflective region of the mask.

A plurality of ohmic contacts may be formed on the respective semiconductors 151, 154, and 155 and between the data line 171 and the source/drain electrodes.

The first passivation layer 180 is formed on the data conductors 171, 173c, 175a, 175b, and 175c and the exposed portion of the semiconductor 154. The first passivation layer 180 may contain an inorganic insulator such as silicon nitride (SiNx), silicon oxynitride (SiOxNy), or silicon oxide (SiOx), or an organic insulator.

Figure 7A:
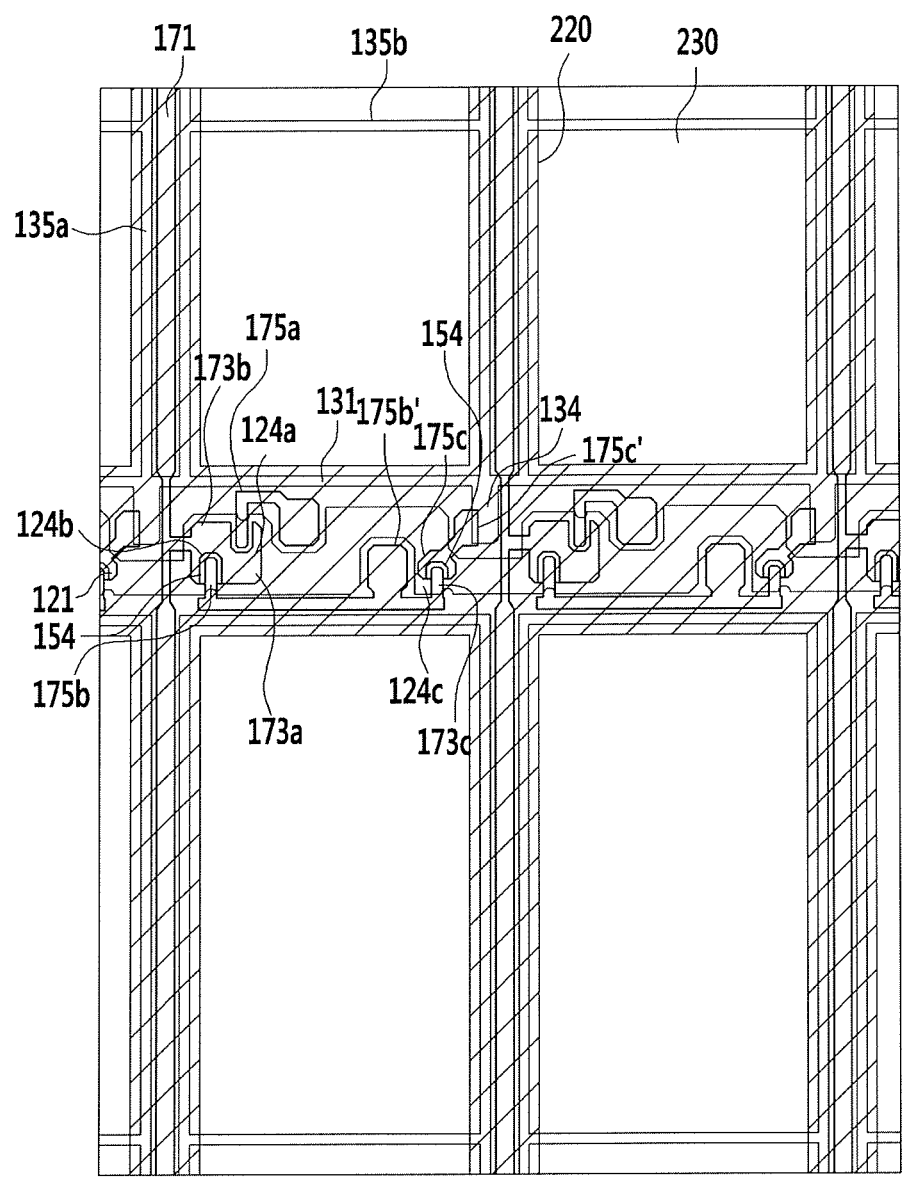
Figure 7B:
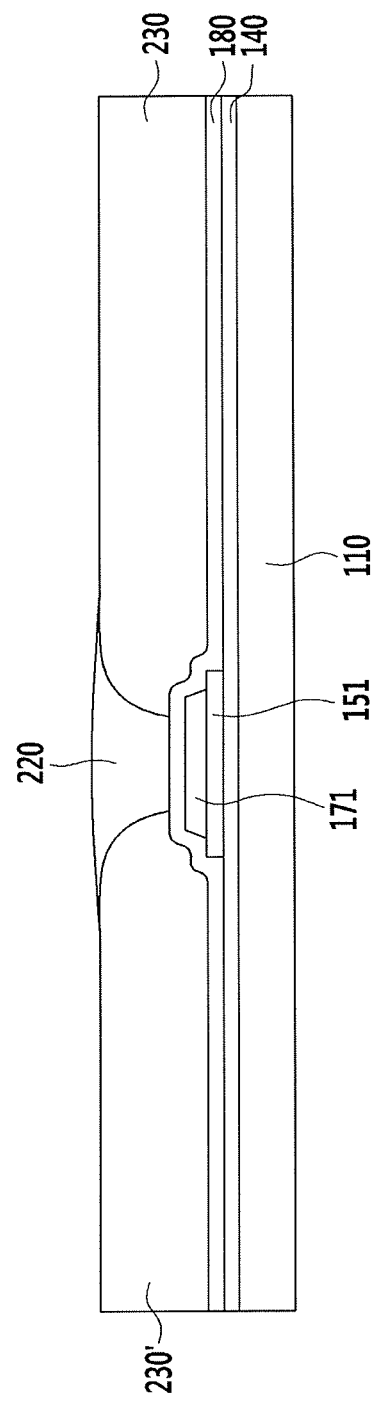

Next, as shown in FIG. 7A and FIG. 7B, a color filter 230 and a light blocking member 220 are formed on the first passivation layer 180. Here, FIG. 7A is a layout view corresponding to FIG. 1, and FIG. 7B is a cross-sectional view corresponding to FIG. 2, which show the color filter 230 and the light blocking member 220 after exposure and etching.

When forming the color filter 230 and the light blocking member 220, the color filter 230 is formed first. A color filter 230 having one color is elongated in a vertical, data line, direction, and color filters 230 and 230' having different colors are formed in adjacent pixels in a horizontal, gate line, direction. As a result, exposing, developing, and etching processes need to be performed for each color filter 230. The color filter 230 for a liquid crystal display including three primary colors is formed by three process cycles of exposing, developing, and etching. In this case, the first formed color filter 230' is formed on the data line 171 and positioned at the lower portion, and the next formed color filter 230 is formed at the upper portion. The color filters 230' and 230 may overlap each other.

The color filter 230 may be removed from positions where the contact holes 186a, 186b, and 186c are formed prior to forming the contact holes 186a, 186b, and 186c.

The black matrix 220 is formed of an opaque material on the first passivation layer 180, indicated by an oblique region of FIG. 7A. As illustrated in FIG. 7A, the black matrix 220 is formed in a lattice structure having openings corresponding to a region where an image is displayed. The color filter 230 is formed in the opening.

The black matrix 220 has a portion formed in a horizontal direction along the gate line 121, the storage voltage line 131, and the thin film transistor, and a portion formed in a vertical direction along the data line 171, as illustrated in FIG. 7A.

Figure 8A:
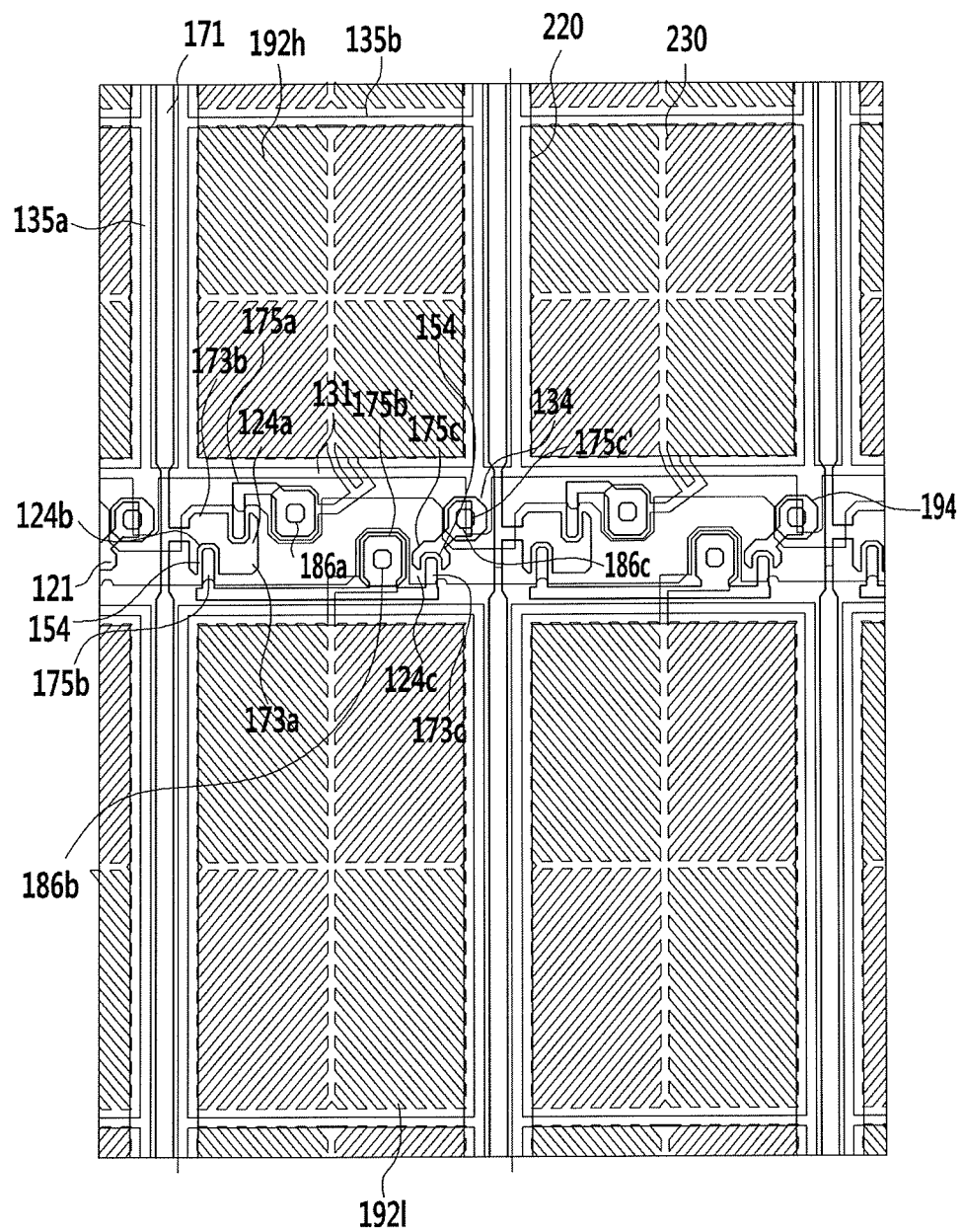
Figure 8B:
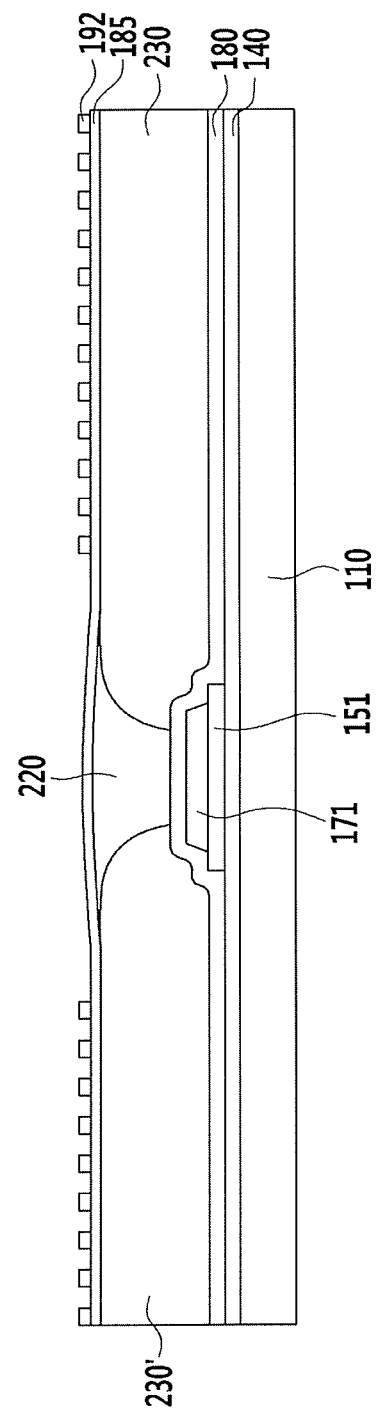

Referring to FIGS. 8A and 8B, the second passivation layer 185 is formed over the color filter 230 and the black matrix 220. The second passivation layer 185 may contain an inorganic insulator such as silicon nitride (SiNx), silicon oxynitride (SiOxNy), or silicon oxide (SiOx), or an organic insulator.

Thereafter, first and second contact holes 186a and 186b are formed in the color filter 230, the black matrix 220, and the passivation layers 180 and 185 that respectively expose the first drain electrode 175a and the extension 175b' of the second drain electrode 175b. Further, the third contact hole 186c is formed in the color filter 230, the black matrix 220, and the passivation layers 180 and 185 to expose the protrusion 134 of the storage voltage line 131 and the extension 175c' of the third drain electrode 175c.

Thereafter, the pixel electrode 192, including the first subpixel electrode 192h and the second subpixel electrode 192l, is formed on the second passivation layer 185. In this case, the pixel electrode 192 may be made of a transparent conductive material such as ITO or IZO. Further, the first subpixel electrode 192h and the second subpixel electrode 192l are respectively connected, both physically and electrically, with the first drain electrode 175a and the second drain electrode 175b through the contact holes 186a and 186b. Further, the connecting member 194 is formed that electrically connects the extension 175c' of the third drain electrode 175c and the protrusion 134 of the storage voltage line 131 through the third contact hole 186c. As a result, a part of the data voltage applied to the second drain electrode 175b is diverted through the third source electrode 173c, and the magnitude of a voltage applied to the second subpixel electrode 192l may be less than the magnitude of the voltage applied to the first subpixel electrode 192h.

Here, FIG. 8B corresponds to FIG. 2, and illustrates a cross-sectional view of the liquid crystal display formed up to FIG. 8A.

Next, as shown in FIG. 9A to FIG. 9D, after forming a sacrificial layer 300, a first column insulating layer material 330' is deposited on the entire region of the panel. The first column insulating layer material 330' may be formed of an inorganic insulating material such as silicon nitride (SiNx), silicon oxide (SiOx), or silicon oxynitride (SiOxNy).

First, a formation process of the sacrificial layer 300 will be described. Various organic layers, such as a photoresist, are deposited on the entire surface of the liquid crystal panel, including the second passivation layer 185 and the pixel electrode 192. Next, the sacrificial layer material is etched to form the structure of the sacrificial layer 300. When using an organic material such as to photoresist, the sacrificial layer 300 may be formed by an exposure process. According to an exemplary embodiment, an additional etching process may be used.

Figure 9A:
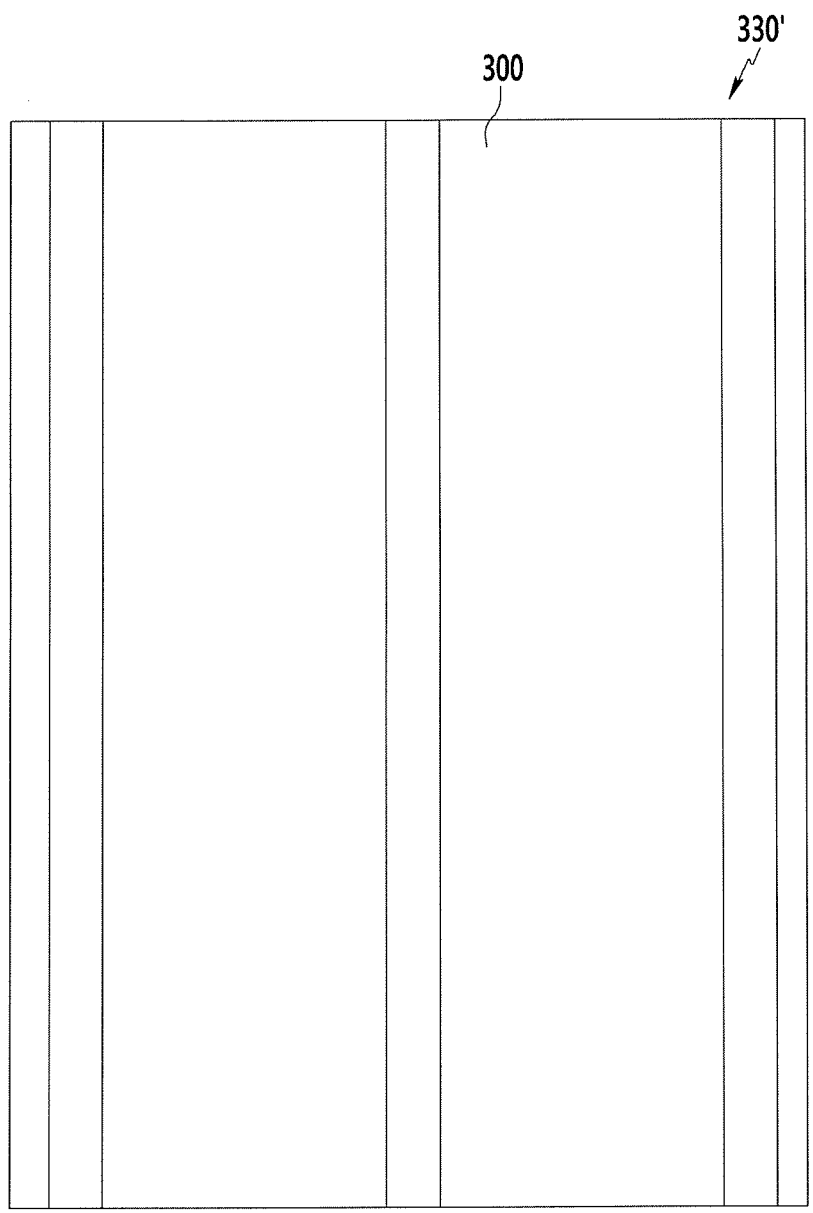
Figure 9B:
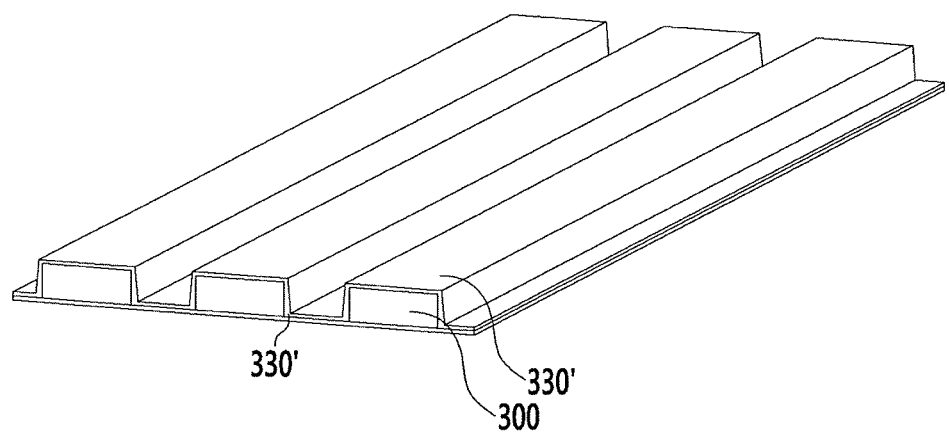

As shown in FIG. 9A, the sacrificial layer 300 extends along the direction of the data line 171, and is elongated along the vertically adjacent pixels. The sacrificial layer 300 is not formed on the data line 171, and adjacent sacrificial layers 300 are separated from each other by a predetermined distance. In addition, the sacrificial layer 300 has the same structure as a microcavity 305 that will be formed later. The upper surface of the sacrificial layer 300 is horizontal and the side surface is tapered.

Figure 9C:
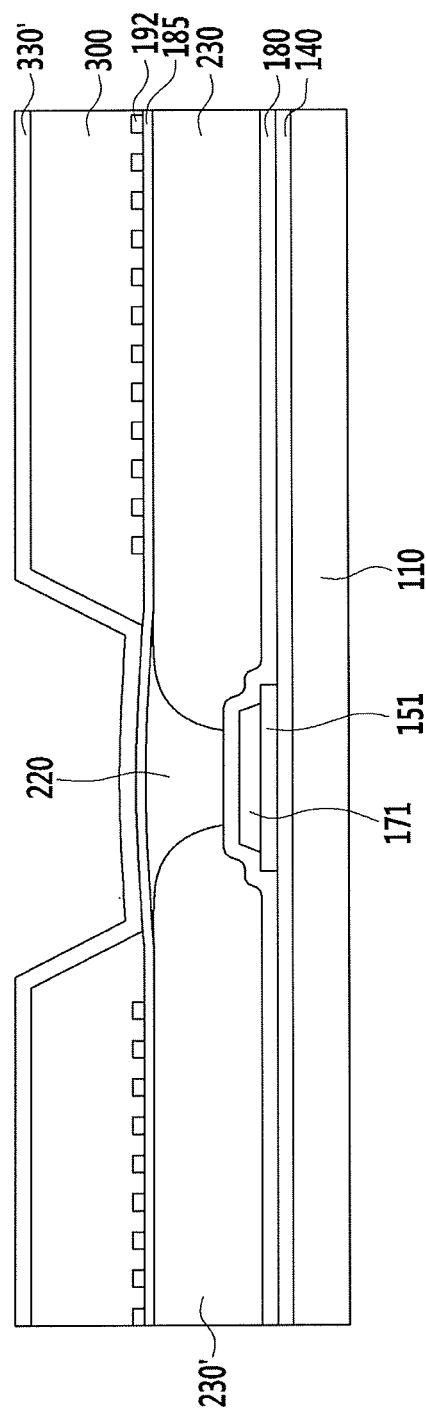

The first column insulating layer material 330' is formed on the upper surface and side surface of the sacrificial layer 300, and, as shown in FIG. 9C, on the second passivation layer 185 in the region where the sacrificial layer 300 is not formed.

Figure 10A:
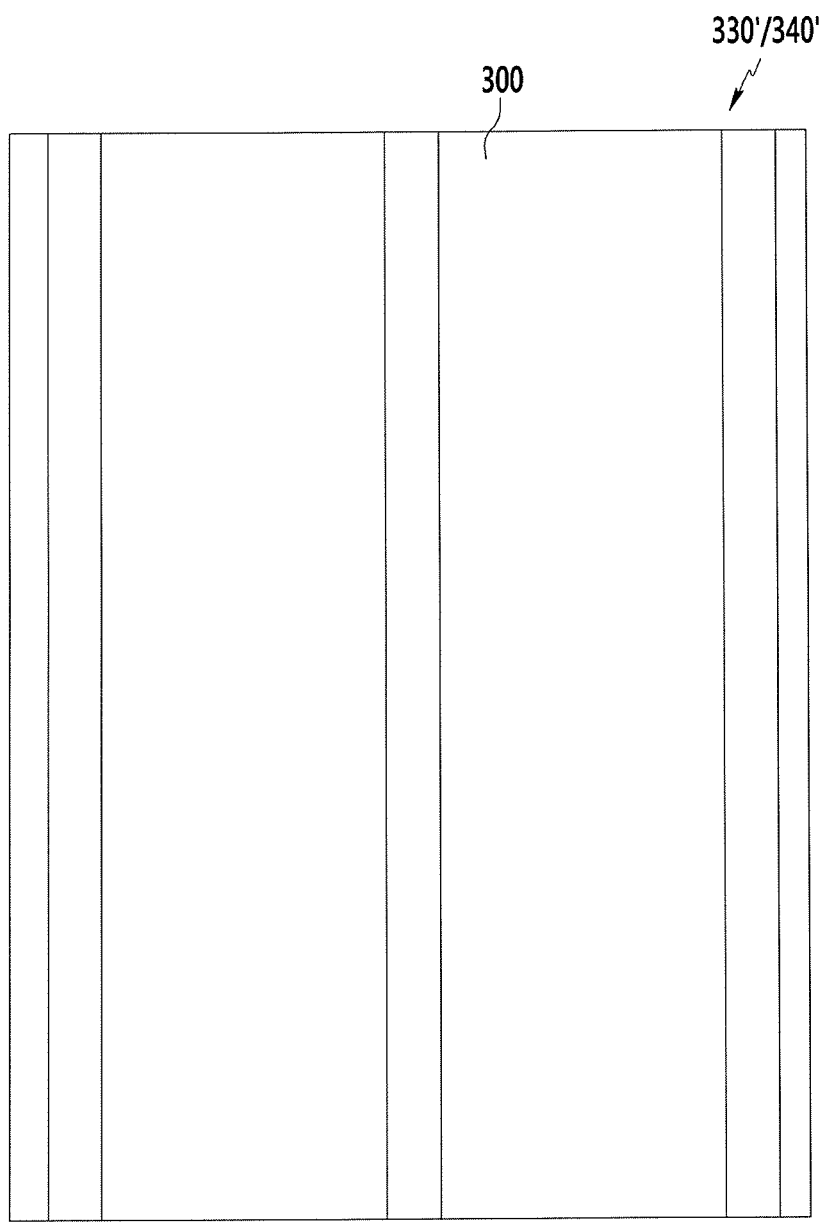
Figure 10B:
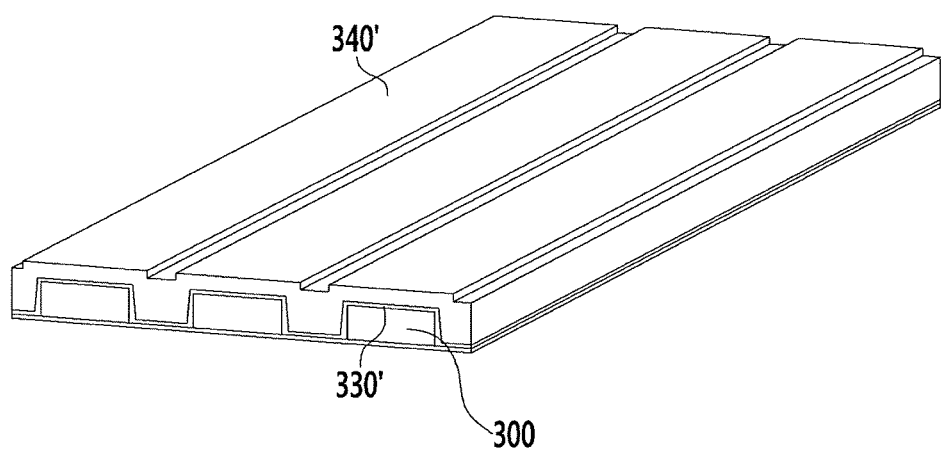
Figure 10C:
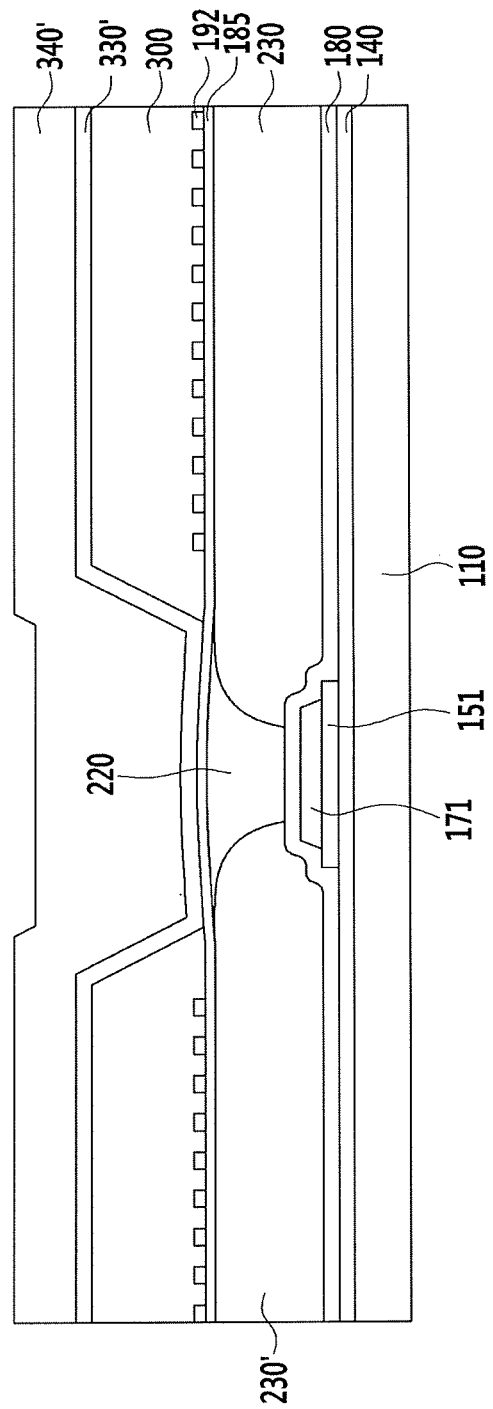
Figure 10D:
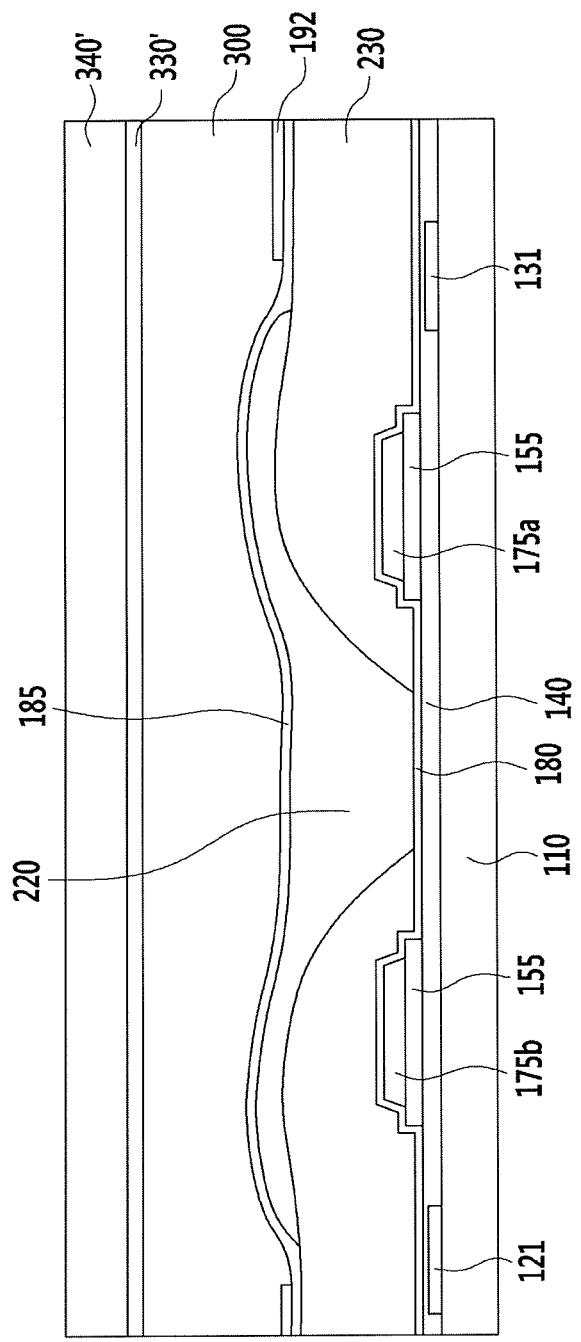

Next, as shown in FIG. 10A to FIG. 10D, a second column organic layer material 340' is formed on the entire surface of the first column insulating layer material 330'. As shown in FIG. 10B and FIG. 10C, the second column organic layer material 340' may have a step structure that corresponds to the structure of the sacrificial layer 300.

Figure 10E:
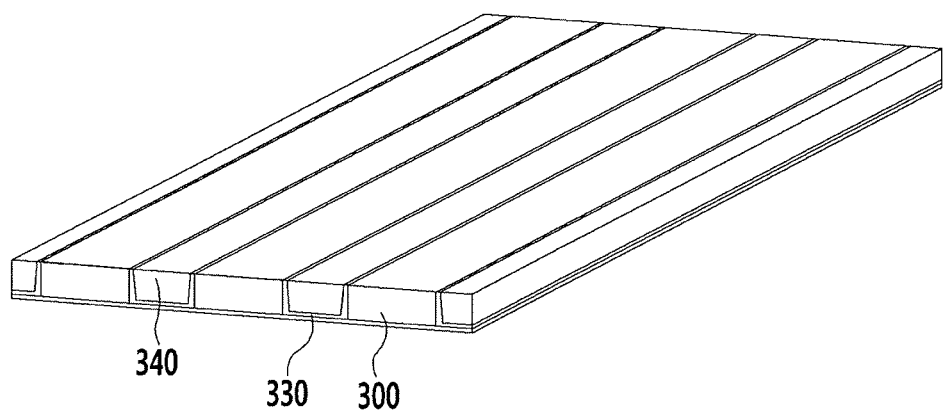

Next, as shown in FIG. 10E to FIG. 10G, the second column organic layer material 340' and the first column insulating layer material 330' are etched using anisotropic dry etching. Here, a depth direction etching may be easily performed compared with a horizontal direction etching. After etching the second column organic layer material 340', if the first column insulating layer material 330' is exposed on the sacrificial layer 300, etching is preformed on the exposed first column insulating layer material 330' on the sacrificial layer 300. As a result, the column portions 330 and 340 shown in FIG. 10E to FIG. 10G, are completed and the sacrificial layer 300 is exposed. The sacrificial layer 300 may be un-touched or partially etched by the anisotropic dry etching.

Next, as shown in FIG. 11A to FIG. 11D, a common electrode 270 and a lower insulating layer 350 are sequentially formed on the sacrificial layer 300 and the column portions 330 and 340. The common electrode 270 and the lower insulating layer 350 are formed on the entire region of the display panel.

Figure 11A:
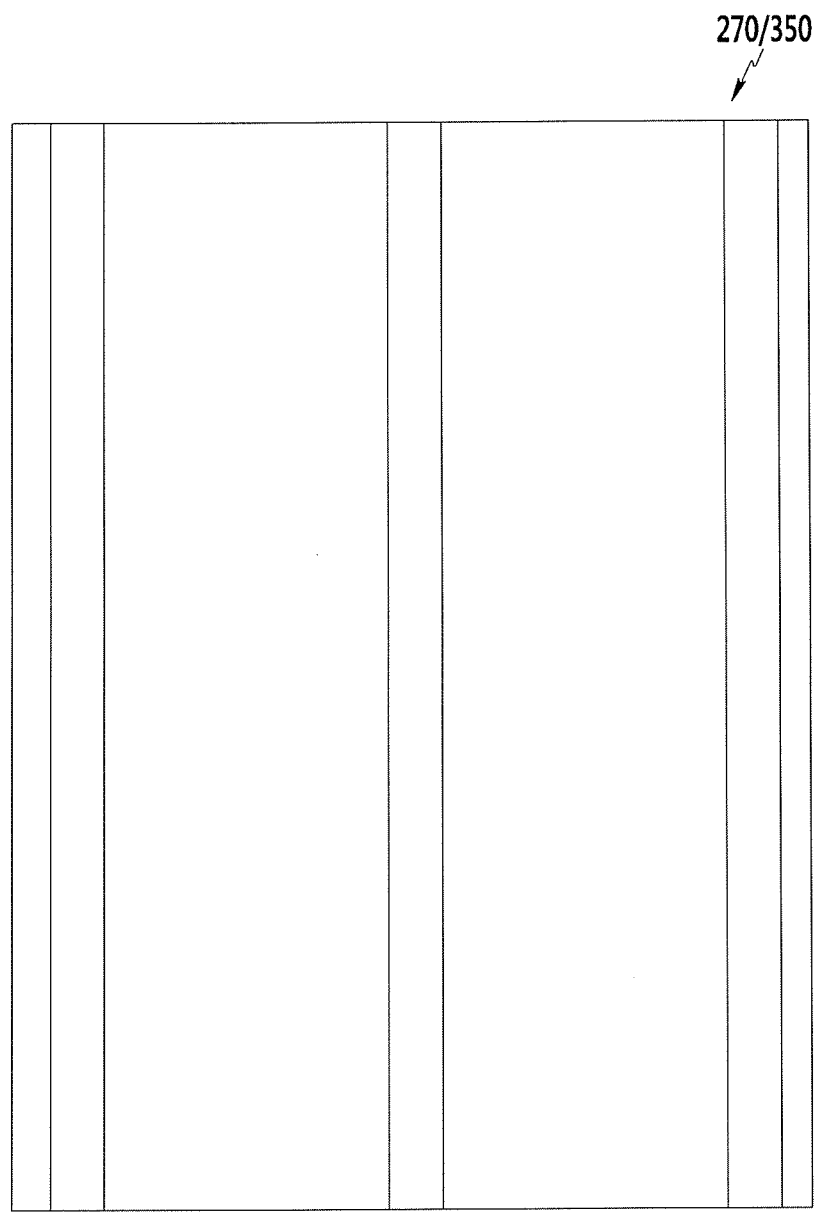
Figure 11B:
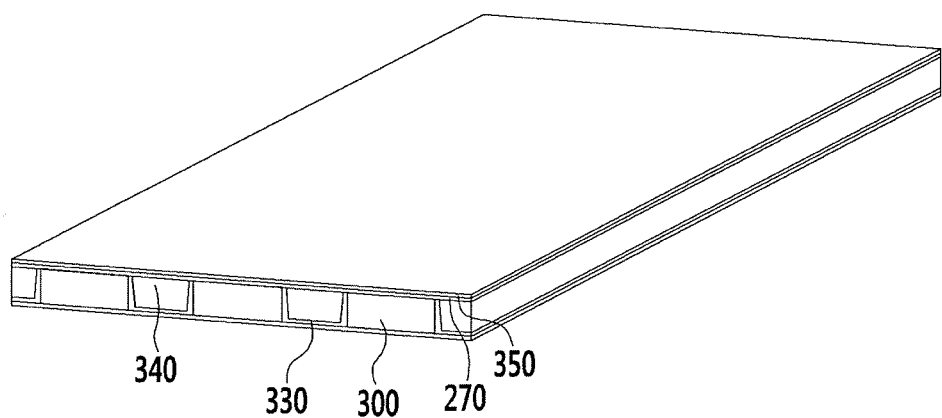
Figure 11C:
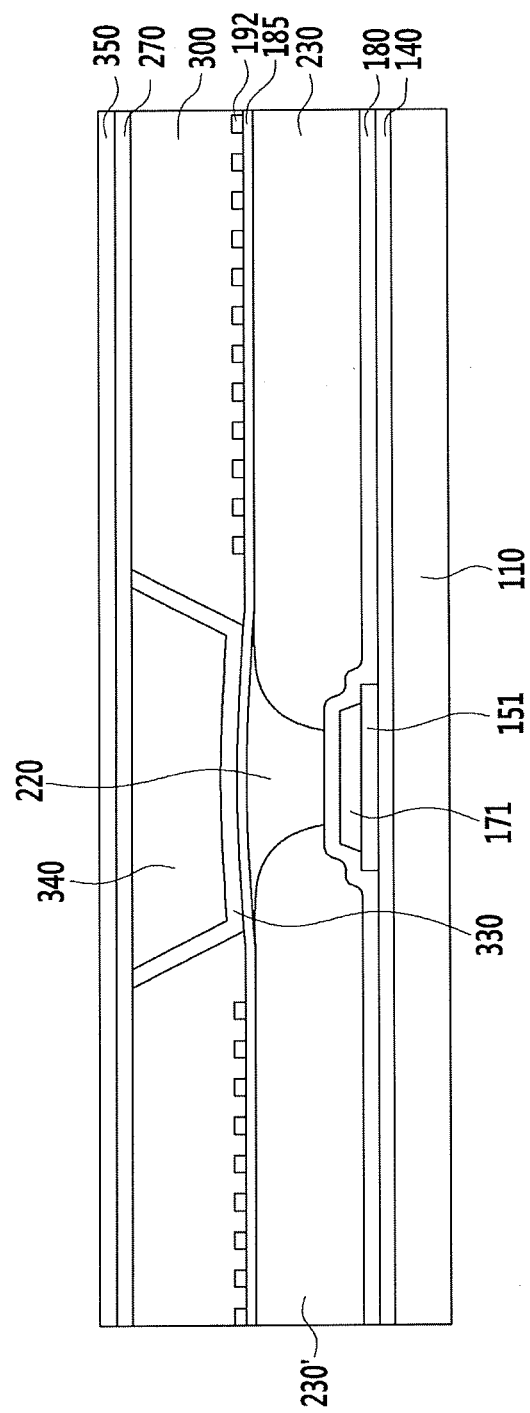
Figure 11D:
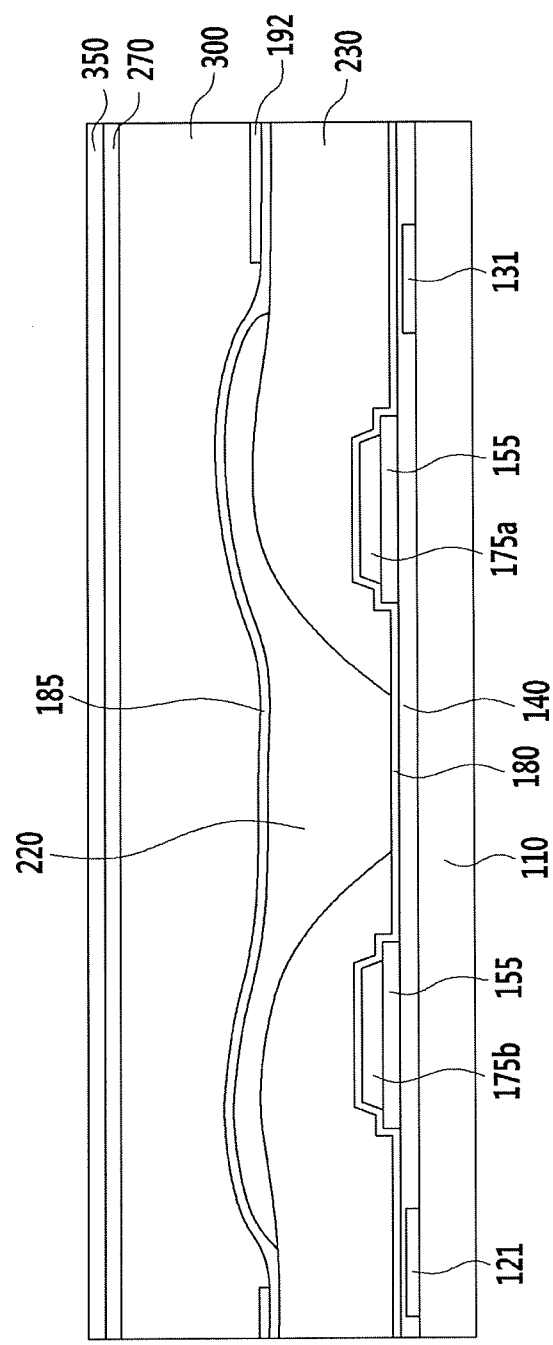

The common electrode 270 is formed of a transparent conductive material such as ITO or IZO that is deposited throughout the entire region of the sacrificial layer 300 and the column portions 330 and 340. The common electrode 270 may have a horizontal structure or may have a curved structure according to an exemplary embodiment. As shown in FIG. 11C and FIG. 11D, the common electrodes 270 are separated from the pixel electrode 192 by the sacrificial layer 300 such that the short circuit possibility between the common electrode 270 and the pixel electrode 192 is very small.

Next, as shown in FIG. 11A to FIG. 11D, a lower insulating layer 350 that includes the inorganic insulating material such as silicon nitride (SiNx), silicon oxide (SiOx), and silicon oxynitride (SiOxNy) is formed on the common electrode 270 over the entire surface of the liquid crystal panel. The lower insulating layer 350 covers the common electrode 270.

Figure 12A:
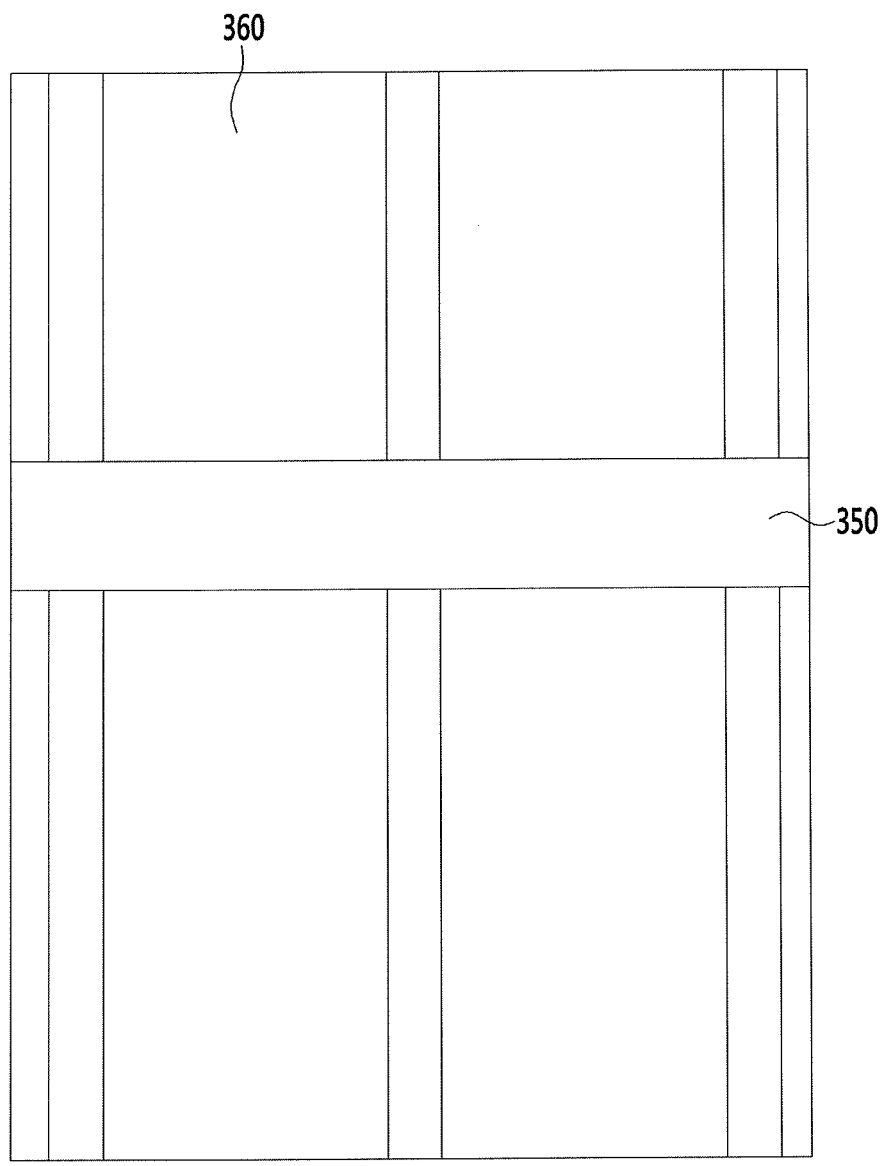
Figure 12B:
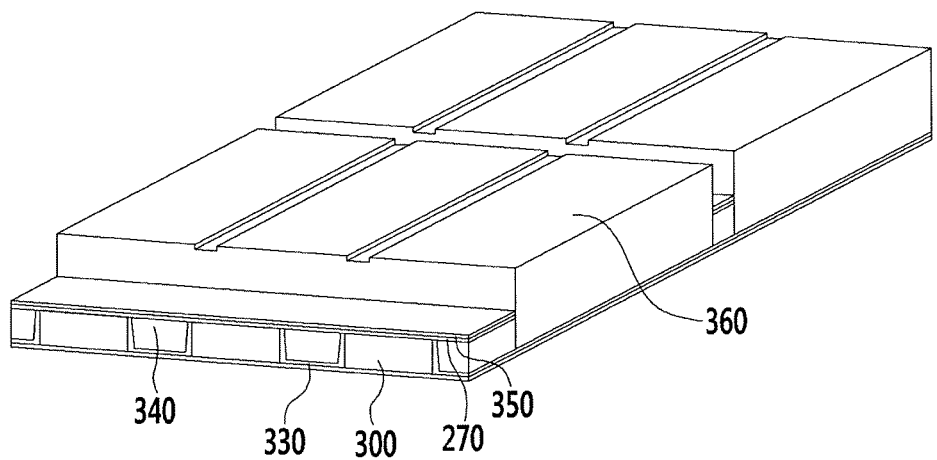
Figure 12D:
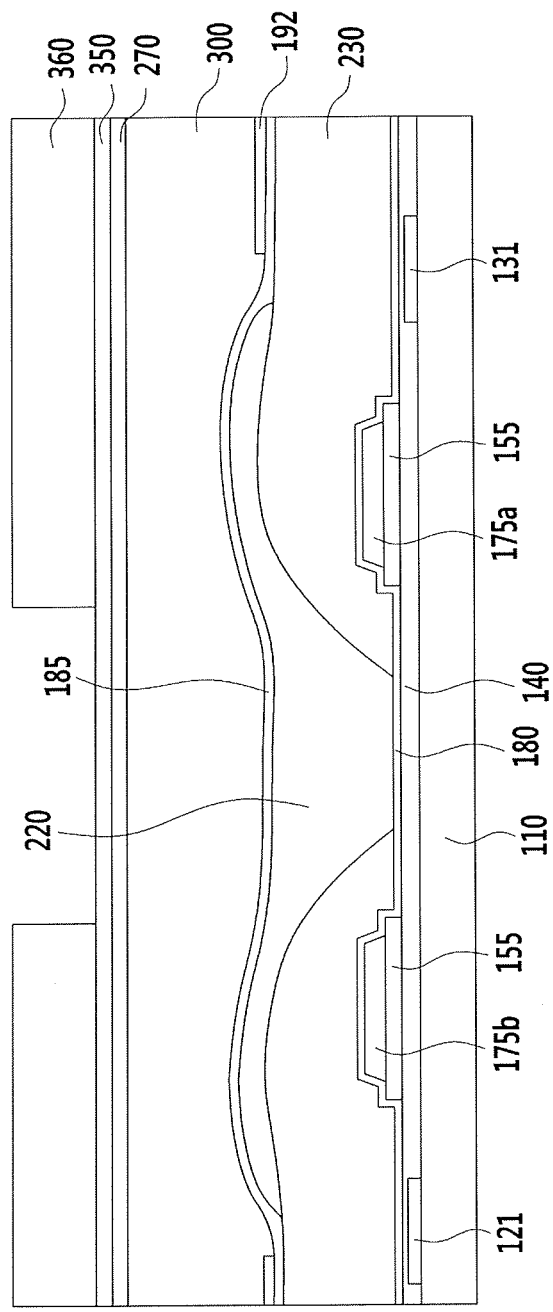
Figure 13A:
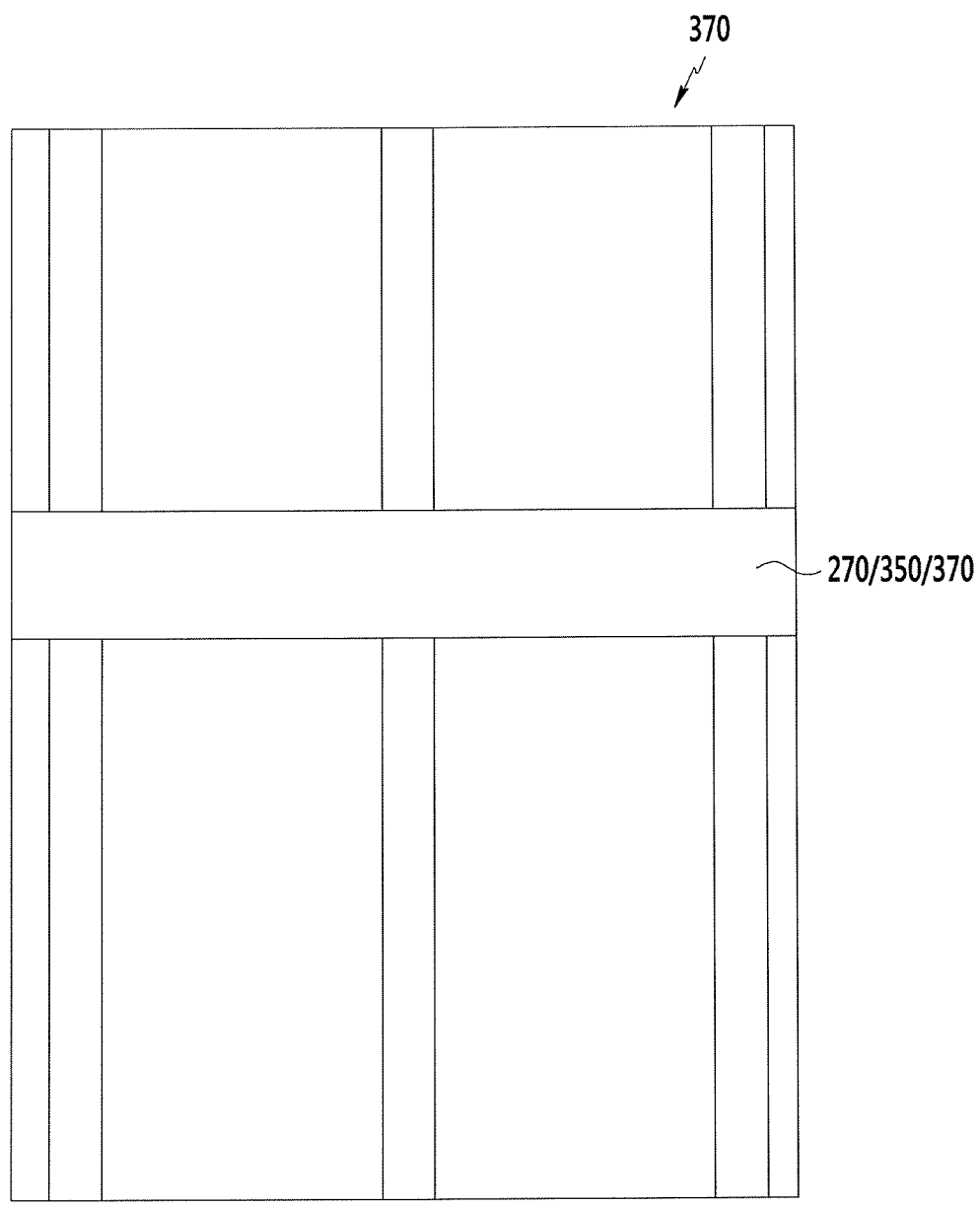
Figure 13B:
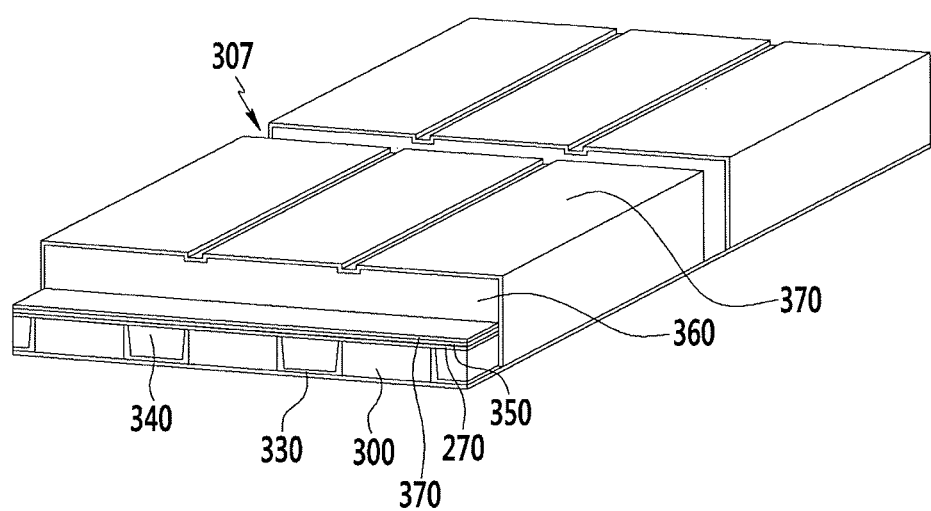
Figure 13C:
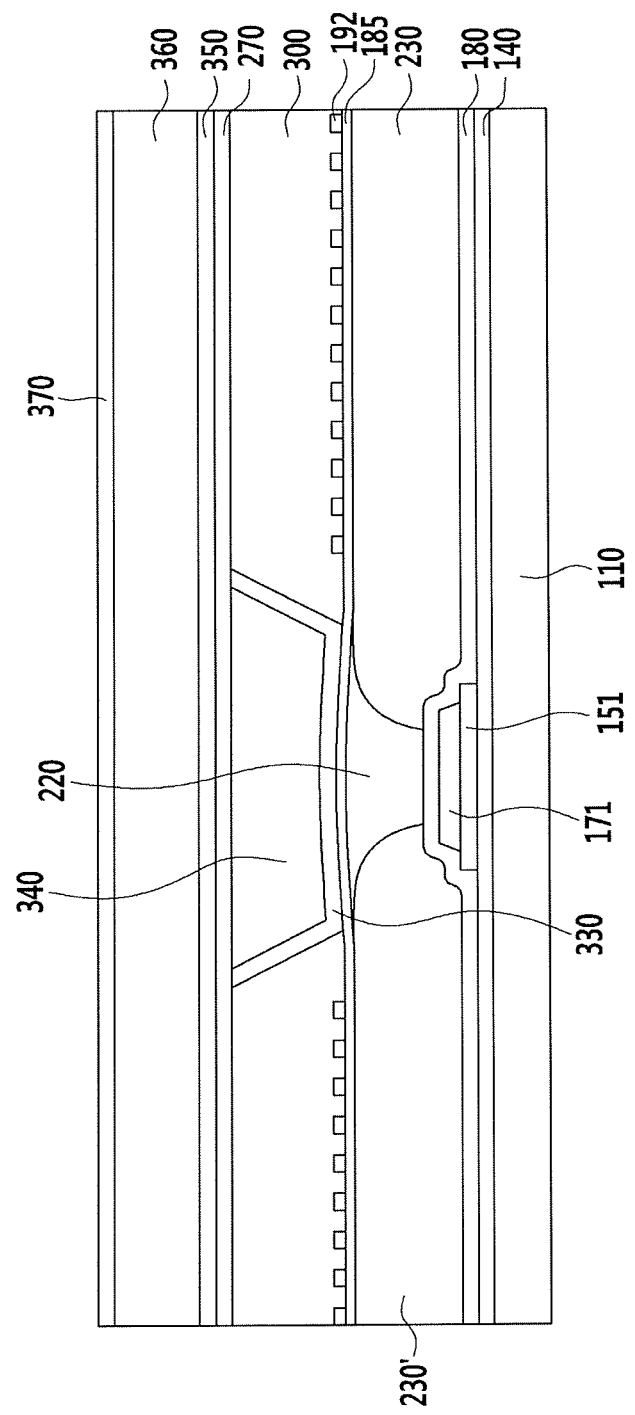
Figure 13D:
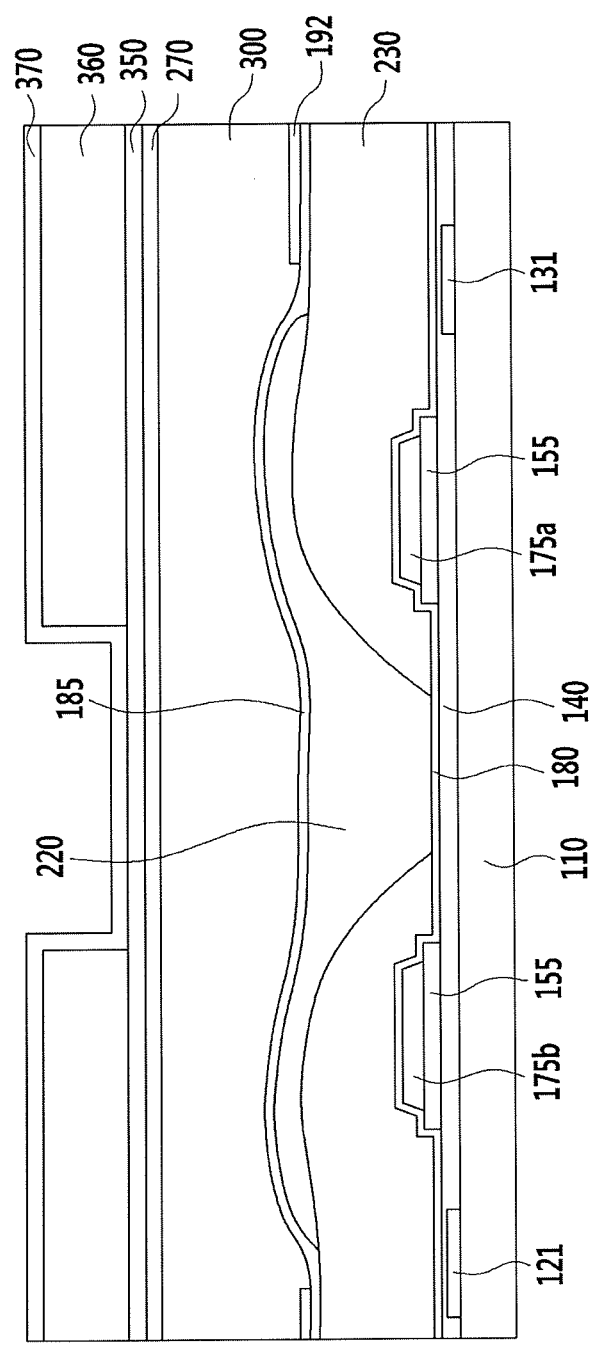

Next, as shown in FIG. 12A to FIG. 12D, a roof layer 360 is formed on the lower insulating layer 350. The roof layer 360 may include an organic material. The roof layer 360 is not formed in a liquid crystal injection hole formation regions 307 where the sacrificial layer 300 is exposed, from which the sacrificial layer 300 is removed to form the liquid crystal injection hole through which the liquid crystal is injected into the microcavity 305. A plurality of adjacent sacrificial layers 300 are exposed in the liquid crystal injection hole formation regions 307. When the sacrificial layer 300 is removed from those regions, a plurality of liquid crystal injection holes may be formed. One liquid crystal injection hole formation region 307 may be formed per pixel column. In FIG. 12A, the liquid crystal injection hole open region is formed to correspond to a thin film transistor formation region, and has a structure extending in a direction parallel to the gate line. Further, since there is no roof layer 360 in the corresponding region, FIG. 12B indirectly illustrates that the lower insulating layer 350 is exposed by reference to the reference numeral.

The roof layer 360 is formed by laminating a material that contains an organic material on the entire region of the liquid crystal panel, exposing and developing the laminated material by using it as a mask, and then removing the material in regions that correspond to the liquid crystal injection hole formation region. In this case, the lower insulating layer 350 formed below the roof layer 360 is exposed but not etched. In the liquid crystal injection hole formation regions, only the common electrode 270 and the lower insulating layer 350 are formed on the sacrificial layer 300 and the column portions 330 and 340, and in other regions, the sacrificial layer 300, the column portions 330 and 340, the common electrode 270, the lower insulating layer 350, and the roof layer 360 are formed.

Next, as illustrated in FIGS. 13A to 13D, a material for an upper insulating layer that contains an inorganic insulating material such as silicon nitride (SiNx), silicon oxide (SiOx), or silicon oxynitride (SiOxNy) is laminated to form the upper insulating layer 370 on the entire surface of the liquid crystal panel.

The upper insulating layer 370 is formed on the roof layer 360 as well as in the liquid crystal injection hole formation region 307 where the roof layer 360 is not formed in which the upper insulating layer 370 is formed directly on the lower insulating layer 350.

Next, as shown in FIG. 14A and FIG. 14B, the liquid crystal injection hole formation region 307 is etched to expose the sacrificial layer 300.

In detail, as illustrated in FIG. 14B, the common electrode 270 remains after etching the lower insulating layer 350 and the upper insulating layer 370 in the liquid crystal injection hole formation regions 307. Next, the common electrode 270 in the liquid crystal injection hole formation region is etched to expose the sacrificial layer 300.

At this time, the column portions 330 and 340 are positioned between the exposed sacrificial layer 300. However the column portions 330 and 340 may be selectively etched and removed as shown in a structure of FIG. 14B. That is, the sacrificial layer 300 may remain, partially etched, and the column portions 330 and 340 may be etched.

According to an exemplary embodiment, the lower insulating layer 350, the upper insulating layer 370, and the common electrode 270 may be etched by the same etch process.

To etch the liquid crystal injection hole formation region 307, a photoresist PR is formed in the entire region, and a photoresist PR portion that corresponds to the liquid crystal injection hole open region is removed to form a photoresist pattern, and thereafter the photoresist pattern is used as a mask to etch the liquid crystal injection hole formation region 307. In this case, in the liquid crystal injection hole formation region 307, the upper insulating layer material 370, the lower insulating layer 350, the common electrode 270, and the sacrificial layer 300 are etched and the layer therebelow is not etched. According to an exemplary embodiment, part or none of the sacrificial layer 300 may be etched. The process of etching the liquid crystal injection hole formation region 307 may be performed by dry etching. However, in the case of an etchant that may etch the etching layer together, the process may be performed by wet etching.

According to an exemplary embodiment, the column portions 330 and 340 positioned at the liquid crystal injection hole formation region 307 may be exposed, however FIG. 14A and FIG. 14B shows a structure in which the column portions 330 and 340 have been removed.

Next, as illustrated in FIG. 14C to 14E, the exposed sacrificial layer 300 is removed. According to the present exemplary embodiment, the sacrificial layer 300 may be removed along with the photoresist pattern using a separate photoresist stripper.

Thereafter, as illustrated in FIGS. 2 and 3, an alignment layer (not illustrated) or the liquid crystal layer 3 may be injected into the microcavity 305 using capillary action.

Next, a capping layer 390 is formed to prevent the liquid crystal layer 3 in the microcavity 305 from leaking out, and then the microcavity 305 may be sealed.

According to an exemplary embodiment, the lower insulating layer 350 and the upper insulating layer 370 may be omitted.

Further, a process of attaching a polarizer (not illustrated) below the insulation substrate 110 and on the upper insulating layer 370 may be further included. The polarizer may include a polarized element and a tri-acetyl-cellulose (TAC) layer for ensuring durability. According to an exemplary embodiment, the transmissive axes of the upper polarizer and lower polarizer may be either perpendicular or parallel to each other.

In a liquid crystal display manufactured by an above described method, the liquid crystal layer 3 is formed in the microcavity 305, and the microcavity sidewall separates the common electrode 270 and the pixel electrode 192 by a predetermined distance that may prevent a short circuit from being generated between the pixel electrode 192 and the common electrode 270 and may prevent display deterioration due to parasitic capacitance.

In the above exemplary embodiments, the common electrode 270 has a horizontal structure without steps.

A structure in which the common electrode 270 has a step structure will be described with reference to FIG. 15 and FIG. 16.

Figure 16:
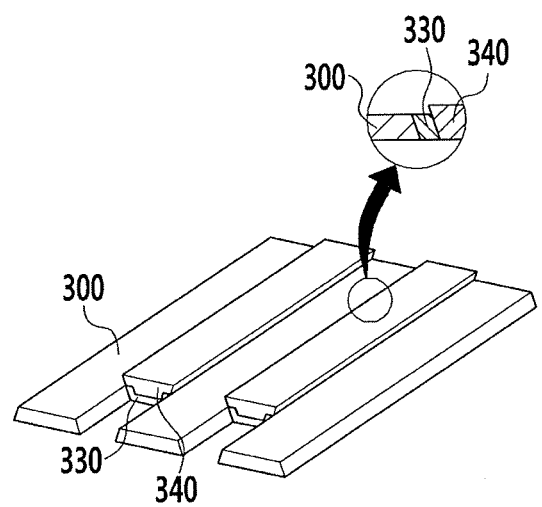
FIG. 16 shows a characteristic of a liquid crystal display according to an exemplary embodiment of FIG. 15.

FIG. 15 shows a manufacturing method of a liquid crystal display according to another exemplary embodiment of the present disclosure, and FIG. 16 shows a characteristic of a liquid crystal display according to an exemplary embodiment of FIG. 15.

FIG. 15 shows a manufacturing method of a liquid crystal display from the step of forming the sacrificial layer 300, and the rest of the manufacturing method may be the same as that of FIG. 4 to FIG. 14.

First, as shown in FIG. 15A, after forming the sacrificial layer 300, a first column insulating layer material 330' is deposited on the entire region of the panel, and a second column organic layer material 340' is coated thereon. Here, the sacrificial layer 300 may be a photoresist, the first column insulating layer material 330' may be an inorganic insulating material such as silicon nitride (SiNx), silicon oxide (SiOx), or silicon oxynitride (SiOxNy), and the second column organic layer material 340' may be a photoresist or other organic materials.

Next, as shown in FIG. 15B, the second column organic layer material 340' is exposed and developed such that the second column organic layer material 340' is positioned between the sacrificial layers 300, not on the sacrificial layer 300. At this time, the height of the second column organic layer material 340' is greater than the height of the first column insulating layer material 330' positioned on the sacrificial layer 300.

Next, as shown in FIG. 15C, an anisotropic dry etching is performed to remove the portion of the second column organic layer material 340' and the first column insulating layer material 330' on the sacrificial layer 300 thereby completing the first column insulating layer 330 and the second column organic layer 340. Although the first column insulating layer material 330' on the sacrificial layer 300 has been removed, the height of the second column organic layer material 340' is higher than the height of the sacrificial layer 300.

Next, as shown in FIG. 15D, a common electrode 270, a lower insulating layer 350, a roof layer 360, and an upper insulating layer 370 are sequentially deposited on the column portions 330 and 340 and the sacrificial layer 300.

Next, although not shown, after exposing the sacrificial layer 300, the sacrificial layer 300 is removed to form a microcavity and a liquid crystal is injected.

FIG. 16 is a perspective view of the sacrificial layer 300 and the column portions 330 and 340 formed by FIG. 15. As described above, if the column portions 330 and 340 are higher than the sacrificial layer 300, when performing the etching to form the column portions 330 and 340, an edge portion of the sacrificial layer 300 is etched to prevent a change of the shape of the microcavity. In addition, the first column insulating layer 330 of the column portion may be protected from the dry etching by the second column organic layer 340.

The common electrode 270 formed by this method has to step. The common electrode 270 and the pixel electrode 192 are separated by at least the height of the sacrificial layer 300 to substantially prevent a short circuit therebetween.

Next, a liquid crystal display according to another exemplary embodiment of the present disclosure will be described with reference to FIG. 17 and FIG. 18.

Figure 17:
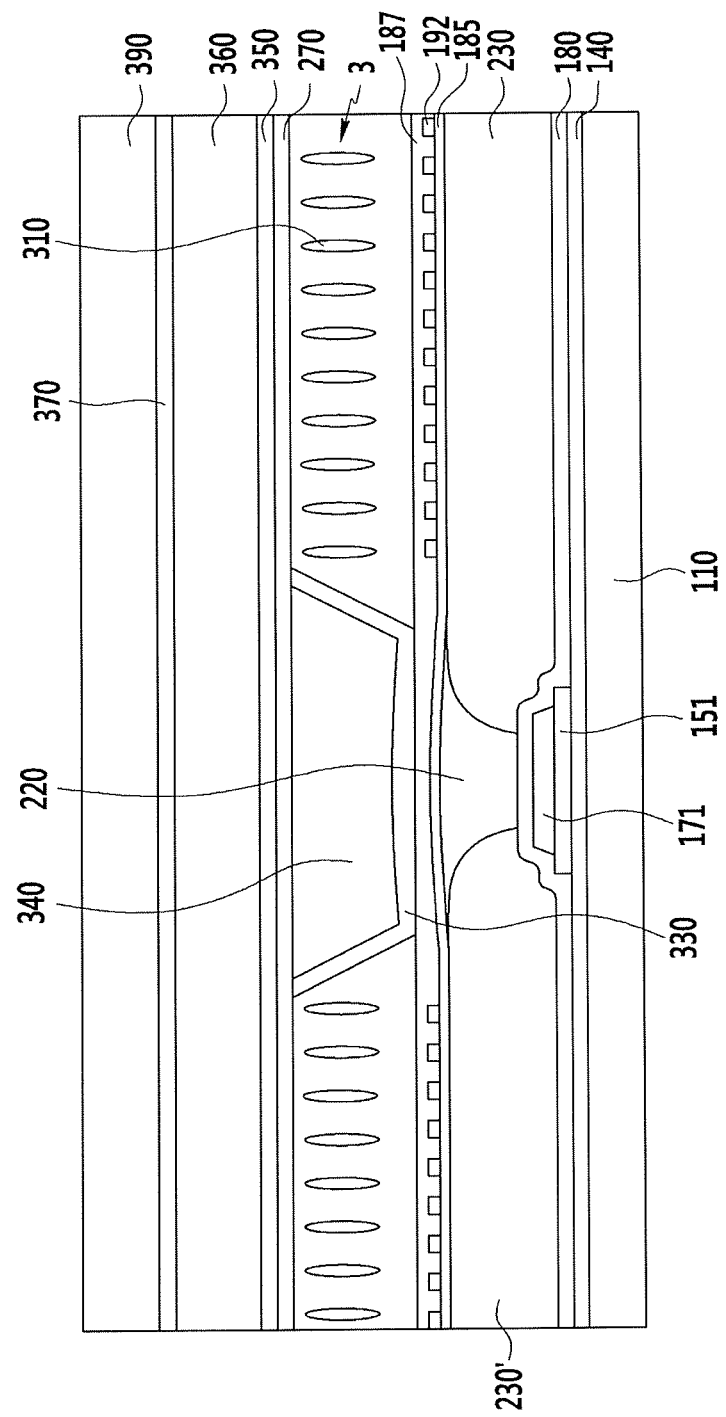
FIG. 17 and FIG. 18 are cross-sectional views of a liquid crystal display according to another exemplary embodiment of the present disclosure.
Figure 18:
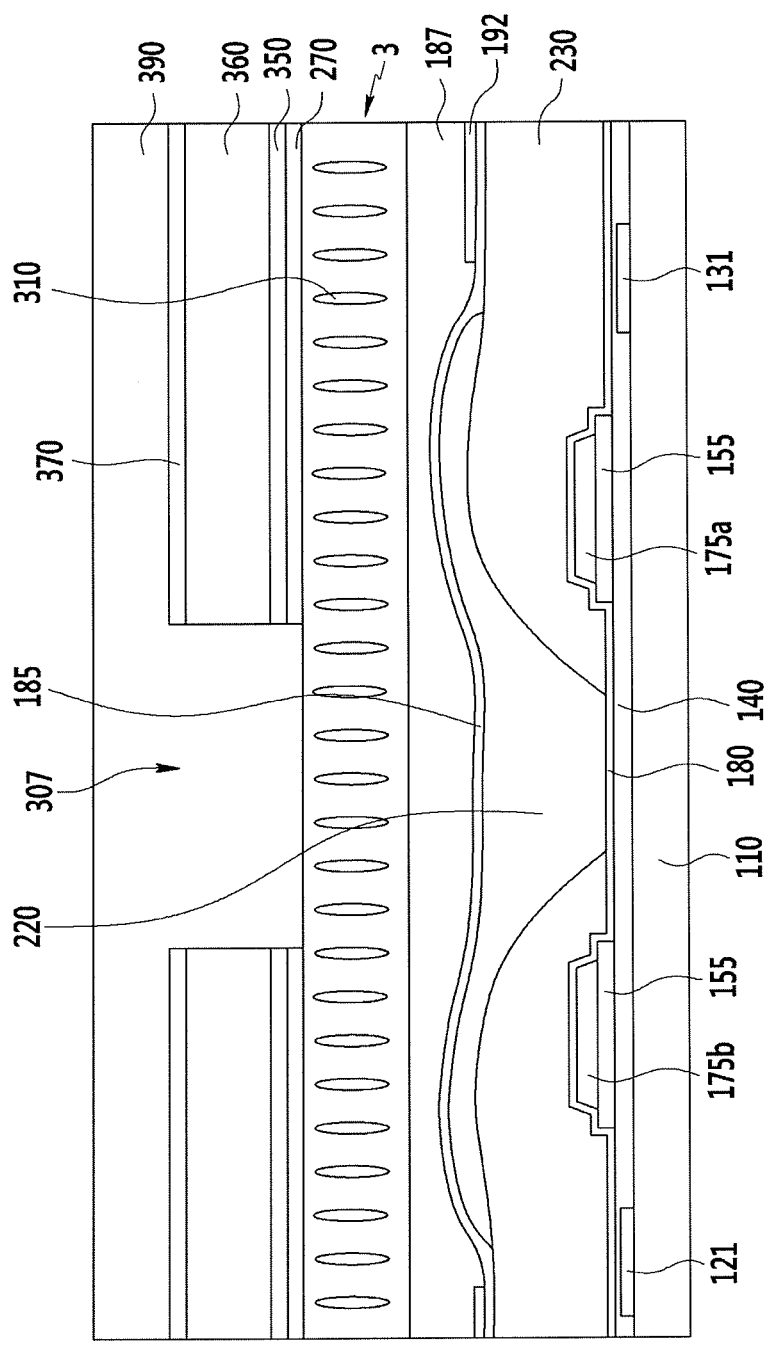

FIG. 17 and FIG. 18 are cross-sectional views of a liquid crystal display according to another exemplary embodiment of the present disclosure.

FIG. 17 and FIG. 18 correspond to FIG. 2 and FIG. 3, but differ from FIGS. 2 and 3 in that a third passivation layer 187 covering the pixel electrode 192 is formed. The third passivation layer 187 may include an organic material or an inorganic material such as silicon nitride. The third passivation layer 187 may also prevent a short circuit between the common electrode 270 and the pixel electrode 192.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display comprising:
    a microcavity formed on an insulation substrate that has a tapered side surface;
    a liquid crystal layer positioned in the microcavity;
    a column portion in contact with the tapered side wall of the microcavity and between microcavities;
    a pixel electrode formed on the insulation substrate and under the microcavity; and
    a common electrode covering the liquid crystal layer and the column portion,
    wherein the column portion comprises a second column organic layer and a first column insulating layer formed outside the second column organic layer,
    wherein the first column insulating layer is formed at a side surface of the second column organic layer and below a lower surface of the second column organic layer,
    a side surface of first column insulating layer coincides with the side wall of the microcavity, and
    at least a portion of the first column insulating layer is positioned between the second column organic layer corresponding to a particular microcavity and the tapered side wall of the same microcavity.

2. The liquid crystal display of claim 1, wherein
    the column portion comprises a photoresist, a material for a light blocking member, an inorganic material, or an organic material.

3. The liquid crystal display of claim 2, wherein
    the first column insulating layer comprises an inorganic insulating material such as silicon nitride (SiNx), silicon oxide (SiOx), or silicon oxynitride (SiOxNy), and
    the second column organic layer is formed of a photoresist or an organic material.

4. The liquid crystal display of claim 1, wherein
    the common electrode has a horizontal structure or a step structure.

5. The liquid crystal display of claim 4, further comprising a third passivation layer covering the pixel electrode.

6. The liquid crystal display of claim 1, further comprising a supporting member on the common electrode that covers the common electrode, wherein
    the supporting member comprises a lower insulating layer positioned on the common electrode,
    a roof layer forged on the insulating layer, and
    an upper insulating layer formed on the roof layer.

* * * * *